US008706146B2

(12) United States Patent
Das et al.

(10) Patent No.: US 8,706,146 B2
(45) Date of Patent: Apr. 22, 2014

(54) OUT-OF-BAND PAGING WITH GROUP IDENTIFIER TO REDUCE MOBILE DETECTION LATENCY

(75) Inventors: Soumya Das, San Diego, CA (US); Samir S. Soliman, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 195 days.

(21) Appl. No.: 13/163,044

(22) Filed: Jun. 17, 2011

(65) Prior Publication Data

US 2012/0322466 A1    Dec. 20, 2012

(51) Int. Cl.
*H04W 68/00* (2009.01)
*H04H 20/71* (2008.01)
*H04W 4/00* (2009.01)

(52) U.S. Cl.
USPC ............................ 455/458; 370/312; 370/328

(58) Field of Classification Search
USPC ............... 455/440, 443–444, 41.1–41.2, 458; 370/312, 328
See application file for complete search history.

(56) References Cited

U.S. PATENT DOCUMENTS

| 2006/0018319 | A1* | 1/2006 | Palin et al. .................... 370/390 |
| 2008/0273485 | A1 | 11/2008 | Tsigler et al. |
| 2009/0163216 | A1 | 6/2009 | Hoang et al. |
| 2010/0164693 | A1 | 7/2010 | Zhang et al. |
| 2012/0052793 | A1* | 3/2012 | Brisebois et al. ................. 455/1 |

OTHER PUBLICATIONS

International Search Report and Written Opinion—PCT/US2012/042529—ISA/EPO—Aug. 20, 2012.

* cited by examiner

*Primary Examiner* — George Eng
*Assistant Examiner* — Nam Huynh
(74) *Attorney, Agent, or Firm* — Jeffrey D. Jacobs

(57) ABSTRACT

Systems, methods, devices, and computer program products are described for using an out-of-band (OOB) radio integrated with the femtocell to implement various novel proximity detection techniques. Proximity detection of access terminals (ATs) in the femtocell's access control list (ACL) can be desirable to support femto connectivity and service provision, for example, in context of idle macro-to-femto handoffs, active macro-to-femto hand-ins, etc. Implementations implement OOB proximity detection through multicasting directed proximity request messages to each AT in a femtocell's ACL. Responses to the proximity request message can include identification information used to determine the specific AT that is in proximity.

51 Claims, 13 Drawing Sheets

OUT-OF-BAND PAGING WITH GROUP IDENTIFIER TO REDUCE MOBILE DETECTION LATENCY

BACKGROUND

Information communication provided by various forms of networks is in wide use in the world today. Networks having multiple nodes in communication using wireless and wired links are used, for example, to carry voice and/or data. The nodes of such networks can be computers, personal digital assistants (PDAs), phones, servers, routers, switches, multiplexers, modems, radios, access points, base stations, etc. Many client device nodes (also referred to as user equipment (UE) or access terminals (ATs)), such as mobile phones, PDAs, tablet devices, multimedia players, laptop computers, etc., are portable and thus can connect with a network through a number of various interfaces.

In some cases, mobile client devices can connect with a network wirelessly via a base station, access point, wireless router, etc. (collectively referred to herein as access points). A mobile client device can remain within the service area of such an access point for a relatively long period of time (referred to as being "camped on" the access point), or can travel relatively rapidly through different access point service areas, with cellular handoff or reselection techniques being used for maintaining a communication session or for idle mode operation as association with access points is changed.

Issues with respect to available spectrum, bandwidth, capacity, etc. can result in a network interface being unavailable or inadequate between a particular client device and access point. Moreover, issues with respect to wireless signal propagation, such as shadowing, multipath fading, interference, etc., can result in a network interface being unavailable or inadequate between a particular client device and access point.

Cellular networks have employed the use of various cell types, such as macrocells, microcells, picocells, and femtocells, to provide desired bandwidth, capacity, and wireless communication coverage within service areas. For example, the use of femtocells is often desirable to provide wireless communication in areas of poor network coverage (e.g., inside of buildings), to provide increased network capacity, to utilize broadband network capacity for backhaul, etc.

SUMMARY

The present disclosure is directed to systems and methods for using an out-of-band (OOB) radio integrated with a femtocell for detection of access terminals (ATs) in the femtocell's proximity. Multiple ATs can be authorized to communicate with a femtocell according to an access control list maintained by the femtocell, and it can be desirable for the femtocell to continually or periodically detect proximity of those authorized ATs to support communications with them as appropriate (e.g., to facilitate idle macro-to-femto handoffs, active macro-to-femto hand-ins, etc.). Implementations use an OOB radio integrated with the femtocell to implement various novel proximity detection techniques that are reliable and efficient.

For example, some techniques use the integrated OOB radio to multicast a directed proximity request message to those ATs on an associated femtocell's access control list. Receiving the message causes each AT to transmit a response message including the AT's unique identification information. The information can be used by the femtocell to determine which ATs are currently in proximity.

An example of a method for out-of-band paging in a femto deployment includes: communicating a directed proximity request message over an out-of-band (OOB) communications channel from a femtocell to an access terminal according to a multicasting scheme and according to an access control list associated with the femtocell, the proximity request message requesting an indication that the access terminal is in proximity; and receiving a response message from the access terminal over the communications channel, the response message indicating that the access terminal is in proximity to the femtocell.

In some embodiments, the OOB radio can be a short-range wireless protocol radio, such as a Bluetooth radio. In addition, the OOB communications channel can be a short-range-wireless protocol channel, such as a Bluetooth channel.

Implementations of such a method may include one or more of the following features. The proximity request message is addressed to a plurality of access terminals. The OOB communications channel used is a short-range-wireless protocol channel. The proximity request message is a short-range-wireless protocol paging message. The proximity request message includes a group identifier associated with each of a plurality of access terminals. The group identifier is a group short-range-wireless protocol device access code associated with each of the plurality of access terminals. The response message is a short-range-wireless protocol page response message. The response message includes a unique identifier associated with a particular one of the plurality of access terminals. The unique identifier is a unique short-range-wireless protocol device access code associated with the particular one of the plurality of access terminals. The method further includes receiving a frequency hopping synchronization (FHS) response message. The FHS response message includes a unique short-range-wireless protocol device address associated with a particular one of the plurality of access terminals.

An additional example of a method for out-of-band paging in a femto deployment includes listening for a directed proximity request message over an out-of-band (OOB) communications channel; receiving a proximity request message over the out-of-band communications channel from a femtocell, where the proximity request message includes either a group identifier associated with the access terminal or a unique identifier associated with the access terminal; and transmitting a response message indicating that the access terminal is in proximity to the femtocell.

Implementations of such a method may include one or more of the following features. The OOB communications channel is a short-range-wireless protocol channel, and the proximity request message is a short-range-wireless protocol paging message. The group identifier is a group short-range-wireless protocol device access code derived from a group short-range-wireless protocol device address, where the group short-range-wireless protocol device address is associated with a plurality of access terminals. The response message includes a unique short-range-wireless protocol device access code associated with the access terminal. The method further includes transmitting an FHS response message where the FHS response messages include a unique short-range-wireless protocol device address associated with the access terminal.

An example femto-proxy system includes a femtocell, configured to provide macro network access to a set of access terminals authorized to attach to the femtocell according to an access control list; and an out-of-band (OOB) radio, integrated with the femtocell and configured to communicate a directed proximity request message over an out-of-band (OOB) communications channel to an access terminal according to a multicasting scheme and according to an access control list associated with the femtocell, the proximity request message requesting an indication that the access terminal is in proximity; and receive a response message from the access terminal over the communications channel, the response message indicating that the access terminal is in proximity to the femtocell.

Implementations of such a system may include one or more of the following features. The proximity request message is addressed to a plurality of access terminals. The OOB communications channel used is a short-range-wireless protocol channel. The proximity request message is a short-range-wireless protocol paging message. The proximity request message includes a group identifier associated with each of a plurality of access terminals. The group identifier is a group short-range-wireless protocol device access code associated with each of the plurality of access terminals. The response message is a short-range-wireless protocol page response message. The response message includes a unique identifier associated with a particular one of the plurality of access terminals. The unique identifier is a unique short-range-wireless protocol device access code associated with the particular one of the plurality of access terminals. The OOB radio is further configured to receive a frequency hopping synchronization (FHS) response message. The FHS response message includes a unique short-range-wireless protocol device address associated with a particular one of the plurality of access terminals.

An example access terminal includes: an in-band communications subsystem configured to communicatively couple with a femtocell over a wireless wide area network (WWAN) link on a first WWAN channel and to communicate with at least one macrocell over the WWAN link on a second WWAN channel; an out-of-band (OOB) communications subsystem configured to communicatively couple with an OOB femto-proxy over an OOB link; and a communications management subsystem, communicatively coupled with the in-band communications subsystem and the OOB communications subsystem, and configured to: listen for a directed proximity request message over an out-of-band (OOB) communications channel; receive a proximity request message over the out-of-band communications channel from a femtocell, where the proximity request message includes either a group identifier associated with the access terminal or a unique identifier associated with the access terminal; and transmit a response message indicating that the access terminal is in proximity to the femtocell.

Implementations of such an access terminal may include one or more of the following features. The OOB communications channel is a short-range-wireless protocol channel; and the proximity request message is a short-range-wireless protocol paging message. The group identifier is a group short-range-wireless protocol device access code derived from a group short-range-wireless protocol device address, where the group short-range-wireless protocol device address is associated with a plurality of access terminals. The response message includes a unique short-range-wireless protocol device access code associated with the access terminal. The communications management subsystem is further configured to transmit an FHS response message where the FHS response messages include a unique short-range-wireless protocol device address associated with the access terminal.

An example computer program product residing on a non-transitory, processor-readable medium includes processor-readable instructions, which, when executed, cause a processor to: communicate a directed proximity request message over an out-of-band (OOB) communications channel from a femtocell to an access terminal according to a multicasting scheme and according to an access control list associated with the femtocell, the proximity request message requesting an indication that the access terminal is in proximity; and receive a response message from the access terminal over the communications channel, the response message indicating that the access terminal is in proximity to the femtocell.

Implementations of such a computer program product may include one or more of the following features. The proximity request message is addressed to a plurality of access terminals. The OOB communications channel used is a short-range-wireless protocol channel. The proximity request message is a short-range-wireless protocol paging message. The proximity request message includes a group identifier associated with each of a plurality of access terminals. The group identifier is a group short-range-wireless protocol device access code associated with each of the plurality of access terminals. The response message is a short-range-wireless protocol page response message. The response message includes a unique identifier associated with a particular one of the plurality of access terminals. The unique identifier is a unique short-range-wireless protocol device access code associated with the particular one of the plurality of access terminals. The processor-readable instructions further cause the processor to receive a frequency hopping synchronization (FHS) response message. The FHS response message includes a unique short-range-wireless protocol device address associated with a particular one of the plurality of access terminals.

An additional example computer program product residing on a non-transitory, processor-readable medium includes processor-readable instructions, which, when executed, cause a processor to: listen for a directed proximity request message over an out-of-band (OOB) communications channel; receive a proximity request message over the out-of-band communications channel from a femtocell, where the proximity request message includes either a group identifier associated with the access terminal or a unique identifier associated with the access terminal; and transmit a response message indicating that the access terminal is in proximity to the femtocell.

Implementations of such a computer program product may include one or more of the following features. The OOB communications channel is a short-range-wireless protocol channel; and the proximity request message is a short-range-wireless protocol paging message. The group identifier is a group short-range-wireless protocol device access code derived from a group short-range-wireless protocol device address, where the group short-range-wireless protocol device address is associated with a plurality of access terminals. The response message includes a unique short-range-wireless protocol device access code associated with the access terminal. The processor-readable instructions further cause the processor to transmit an FHS response message where the FHS response messages includes a unique short-range-wireless protocol device address associated with the access terminal.

An example system includes: means for communicating a directed proximity request message over an out-of-band (OOB) communications channel from a femtocell to an access terminal according to a multicasting scheme and according to an access control list associated with the femtocell, where the proximity request message requests an indication that the access terminal is in proximity and where the OOB communications channel is a short-range-wireless communications channel; and means for receiving a response message from the access terminal over the communications channel, the response message indicating that the access terminal is in proximity to the femtocell.

Implementations of such a system may include one or more of the following features. The proximity request message is addressed to a plurality of access terminals. The proximity request message is a short-range-wireless protocol paging message. The proximity request message includes a group identifier associated with each of a plurality of access terminals. The group identifier is a group short-range-wireless protocol device access code associated with each of the plurality of access terminals. The response message is a short-range-wireless protocol page response message. The response message includes a unique identifier associated with a particular one of the plurality of access terminals. The unique identifier is a unique short-range-wireless protocol device access code associated with the particular one of the plurality of access terminals. The system further includes means for receiving a frequency hopping synchronization (FHS) response message. The FHS response message includes a unique short-range-wireless protocol device address associated with a particular one of the plurality of access terminals.

Another example system includes: means for listening for a directed proximity request message over an out-of-band (OOB) communications channel; means for receiving a proximity request message over the out-of-band communications channel from a femtocell, where the proximity request message includes either a group identifier associated with the access terminal or a unique identifier associated with the access terminal; and means for transmitting a response message indicating that the access terminal is in proximity to the femtocell.

Implementations of such a system may include one or more of the following features. The OOB communications channel is a short-range-wireless protocol channel, and the proximity request message is a short-range-wireless protocol paging message. The group identifier is a group short-range-wireless protocol device access code derived from a group short-range-wireless protocol device address, where the group short-range-wireless protocol device address is associated with a plurality of access terminals. The response message includes a unique short-range-wireless protocol device access code associated with the access terminal. The system further includes means for transmitting an FHS response message where the FHS response messages include a unique short-range-wireless protocol device address associated with the access terminal.

The foregoing has outlined rather broadly the features and technical advantages of examples according to disclosure in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

DETAILED DESCRIPTION

Figure 1:
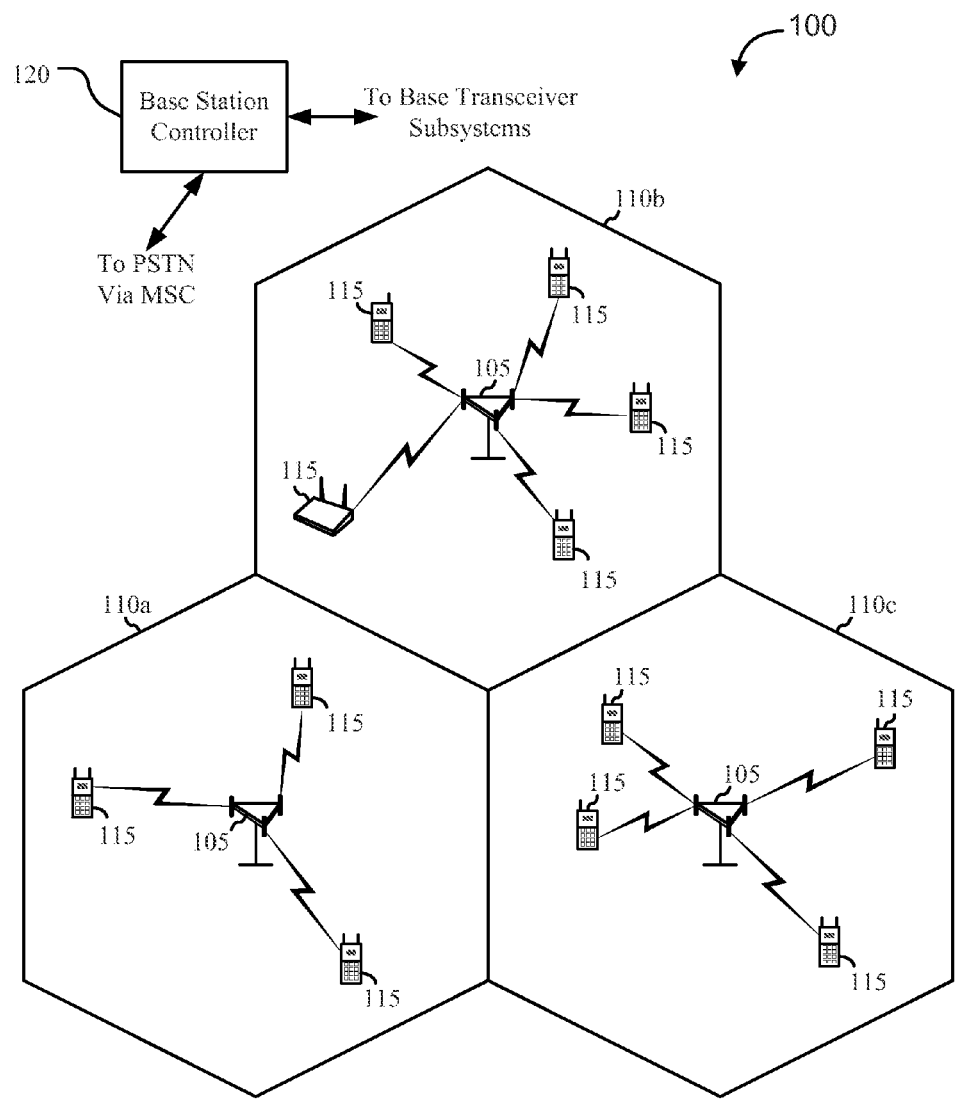
FIG. 1 is a block diagram of a wireless communications system.

Typically, multiple ATs are authorized to communicate with a femtocell according to an access control list maintained by the femtocell. In order to maintain communications links with those ATs as appropriate (e.g., to facilitate idle macro-to-femto handoffs, active macro-to-femto hand-ins, etc.), the femtocell determines when an authorized AT enters or leaves a coverage area associated with the femtocell by monitoring each AT's proximity to the femtocell. Using WWAN (e.g., cellular) techniques to monitor proximity can be undesirable, for example, as configuring the AT to periodically send registration messages to the femtocell can undesirably impact battery life of the AT. In some embodiments, the periodic registration over WWAN is only for idle mode.

Techniques are described herein for using an OOB radio integrated (e.g., a Bluetooth® radio) with a femtocell to implement various novel proximity detection techniques. For example, in some implementations, a proximity request message is multicast over an OOB communications channel to one or more ATs in a femtocell's access control list. The transmitted proximity request message can include a group identifier associated with each of the one or more ATs. The group identifier can indicate to each AT that the proximity request message is addressed to the AT. Following the transmission of the proximity request message, a proximity response message is received from each of the ATs currently in proximity to the femtocell. Each received proximity response message can include identification information associated with the responding AT. Based on the identification information, the identity of each responding AT is determined. In particular, a lookup table or other suitable data structure is used to match the identification information of each proximity response message to a particular AT in the femtocell's access control list.

Techniques described herein for OOB detection of mobiles at femtocells can be used for femtocells using various wireless communication systems such as CDMA, TDMA, FDMA, OFDMA, SC-FDMA, and other systems. The terms "system" and "network" are often used interchangeably. A CDMA system can implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system can implement a radio technology such as Global System for Mobile Communications (GSM). An OFDMA system can implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein can be used for the systems and radio technologies mentioned above, as well as for other systems and radio technologies.

Thus, the following description provides examples and is not limiting of the scope, applicability, or configuration set forth in the claims. Changes can be made in the function and arrangement of elements discussed without departing from the spirit and scope of the disclosure. Various examples can omit, substitute, or add various procedures or components as appropriate. For instance, the methods described can be performed in an order different from that described, and various operations can be added, omitted, or combined. Also, features described with respect to certain examples can be combined in other examples.

Referring first to FIG. 1, a block diagram illustrates an example of a wireless communications system 100. The system 100 includes base transceiver stations (BTSs) 105, disposed in cells 110, mobile access terminals 115 (ATs), and a base station controller (BSC) 120. It is worth noting that terminology like access terminal (AT), mobile station (MS), and others are used interchangeably herein and are not intended to imply a particular network topology or implementation. For example, while the "MS" terminology can typically be used for circuit switched (e.g., CDMA 1×) networks, and the "AT" terminology can typically be used for packet data service (e.g., EV-DO, HRPD) networks, the techniques described herein can be applied in the context of any of these or other networks.

The system 100 can support operation on multiple carriers (e.g., waveform signals of different frequencies). Multi-carrier transmitters can transmit modulated signals simultaneously on the multiple carriers. Each modulated signal can be a CDMA signal, a TDMA signal, an OFDMA signal, a SC-FDMA signal, etc. Each modulated signal can be sent on a different carrier and can carry pilot, overhead information, data, etc. The system 100 can be a multi-carrier LTE network capable of efficiently allocating network resources.

The BTSs 105 can wirelessly communicate with the ATs 115 via a base station antenna. The BTSs 105 are configured to communicate with the ATs 115 under the control of the BSC 120 via multiple carriers. Each of the BTSs 105 can provide communication coverage for a respective geographic area, indicated here by cells 110-a, 110-b, or 110-c. The system 100 can include BTSs 105 of different types, for example, macro, pico, and/or femto base stations.

The ATs 115 can be dispersed throughout the cells 110. The ATs 115 can be referred to as mobile stations, mobile devices, user equipment (UE), or subscriber units. The ATs 115 here include cellular phones and a wireless communication device, but can also include personal digital assistants (PDAs), other handheld devices, netbooks, notebook computers, etc.

For the discussion below, the ATs 115 operate on (are "camped" on) a macro or similar network facilitated by multiple "macro" BTSs 105. Each macro BTS 105 can cover a relatively large geographic area (e.g., several kilometers in radius) and can allow unrestricted access by terminals with service subscription. The ATs 115 are also registered to operate on at least one femto network facilitated by a "femto" or "home" BTS 105. It will be appreciated that, while the macro BTSs 105 can typically be deployed according to network planning (e.g., resulting in the illustrative hexagonal cells 110 shown in FIG. 1), a femto BTS 105 can typically be deployed by individual users (or user representatives) to create a localized femtocell. The localized femtocell does not typically follow the macro network planning architecture (e.g., the hexagonal cells), although it can be accounted for as part of various macro-level network planning and/or management decisions (e.g., load balancing, etc.).

The AT 115 can generally operate using an internal power supply, such as a small battery, to facilitate highly mobile operations. Strategic deployment of network devices, such as femtocells, can mitigate mobile device power consumption to some extent. For example, femtocells can be utilized to provide service within areas which might not otherwise experience adequate or even any service (e.g., due to capacity limitations, bandwidth limitations, signal fading, signal shadowing, etc.), thereby allowing client devices to reduce searching times, to reduce transmit power, to reduce transmit times, etc. Femtocells provide service within a relatively small service area (e.g., within a house or building). Accordingly, a client device is typically disposed near a femtocell when being served, often allowing the client device to communicate with reduced transmission power.

For example, the femtocell is implemented as a femto access point (FAP) located in a user premises, such as a residence, an office building, etc. The location can be chosen for maximum coverage (e.g., in a centralized location), to allow access to a global positioning satellite (GPS) signal (e.g., near a window), and/or in any other useful location. For the sake of clarity, the disclosure herein assumes that a set of ATs 115 are registered for (e.g., on a whitelist of) a single FAP that provides coverage over substantially an entire user premises. The "home" FAP provides the ATs 115 with access to communication services over the macro network. As used herein, the macro network is assumed to be a wireless wide-area network (WWAN). As such, terms like "macro network" and "WWAN network" are interchangeable. Similar techniques can be applied to other types of network environments without departing from the scope of the disclosure or claims.

In example configurations, the FAP is integrated with one or more out-of-band (OOB) proxies as a femto-proxy system. As used herein, "out-of-band" or "OOB" includes any type of communications that are out of band with respect to the WWAN link. For example, the OOB proxies and/or the ATs 115 can be configured to operate using Bluetooth (e.g., class 1, class 1.5, and/or class 2), Bluetooth Low Energy (LE), ZigBee (e.g., according to the IEEE 802.15.4-2003 wireless standard), WiFi, and/or any other useful type of communications out of the macro network band. Notably, OOB integration with the FAP can provide a number of features, including, for example, reduced interference, lower power femto discovery, etc.

Further, the integration of OOB functionality with the FAP can allow the ATs 115 attached to the FAP to also be part of an OOB piconet. The piconet can facilitate enhanced FAP functionality, other communications services, power management functionality, and/or other features to the ATs 115. These and other features will be further appreciated from the description below.

Figure 2A:
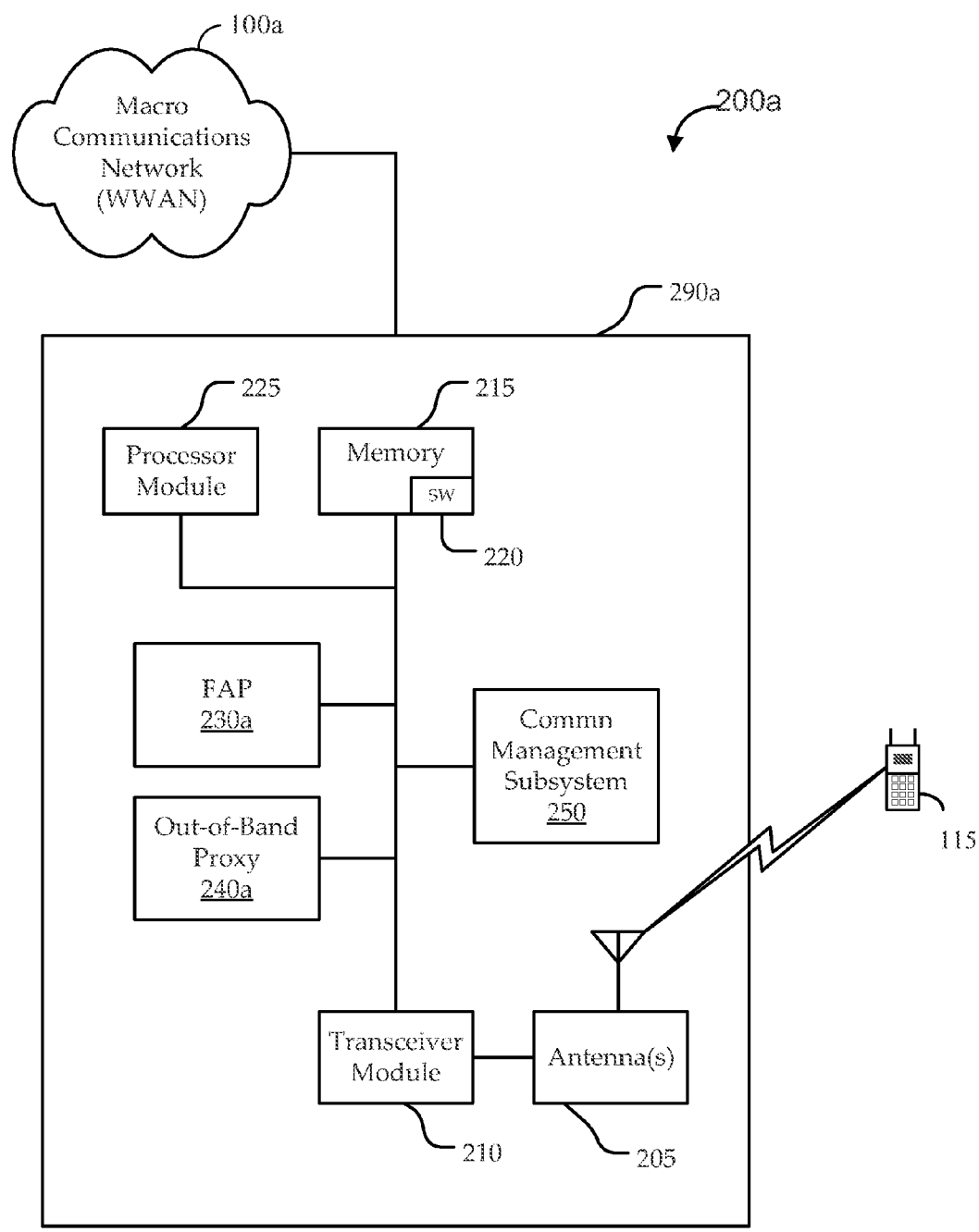
FIG. 2A is a block diagram of an exemplary wireless communications system that includes a femto-proxy system.

FIG. 2A shows a block diagram of a wireless communications system 200a that includes a femto-proxy system 290a. The femto-proxy system 290a includes an OOB proxy 240a, a FAP 230a, and a communications management subsystem 250. The FAP 230a can be a femto BTS 105, as described with reference to FIG. 1. The femto-proxy system 290a also includes antennas 205, a transceiver module 210, memory 215, and a processor module 225, which each can be in communication, directly or indirectly, with each other (e.g., over one or more buses). The transceiver module 210 is configured to communicate bi-directionally, via the antennas 205, with the ATs 115. The transceiver module 210 (and/or other components of the femto-proxy system 290a) is also configured to communicate bi-directionally with a macro communications network 100a (e.g., a WWAN). For example, the transceiver module 210 is configured to communicate with the macro communications network 100a via a backhaul network. The macro communications network 100a can be the communications system 100 of FIG. 1.

The memory 215 can include random access memory (RAM) and read-only memory (ROM). The memory 215 can also store computer-readable, computer-executable software code 220 containing instructions that are configured, when executed, to cause the processor module 225 to perform various functions described herein (e.g., call processing, database management, message routing, etc.). Alternatively, the software 220 may not be directly executable by the processor module 225, but can be configured to cause the computer, when compiled and executed, to perform functions described herein. In some implementations, the memory 215 can store a group device address associated with one or more of the ATs 115. The group device address can be used to multicast proximity request messages to the ATs 115. In certain implementations, the group address can have the same format as a standard 48-bit Bluetooth device address (e.g., BD_ADDR).

The processor module 225 can include an intelligent hardware device, for example, a central processing unit (CPU) such as those made by Intel® Corporation or AMD®, a microcontroller, an application specific integrated circuit (ASIC), etc. The processor module 225 can include a speech encoder (not shown) configured to receive audio via a microphone, convert the audio into packets (e.g., 30 ms in length) representative of the received audio, provide the audio packets to the transceiver module 210, and provide indications of whether a user is speaking Alternatively, an encoder can only provide packets to the transceiver module 210, with the provision or withholding/suppression of the packet itself providing the indication of whether a user is speaking In some implementations, the processor module 225 can execute a suitable mapping function to generate a group device address. The processor module 225 can additionally store the generated group device address in, for example, memory 215.

The transceiver module 210 can include a modem configured to modulate the packets and provide the modulated packets to the antennas 205 for transmission, and to demodulate packets received from the antennas 205. While some examples of the femto-proxy system 290a can include a single antenna 205, the femto-proxy system 290a preferably includes multiple antennas 205 for multiple links or channels. For example, one or more links or channels can be used to support macro communications with the ATs 115. Also, one or more out-of-band links or channels can be supported by the same antenna 205 or different antennas 205.

Notably, the femto-proxy system 290a is configured to provide both FAP 230a and OOB proxy 240a functionality. For example, when the AT 115 approaches the femtocell coverage area, the AT's 115 OOB radio can begin searching for the OOB proxy 240a. Various novel techniques for AT 115 discovery using the OOB radio are described in more detail below. Upon discovery, the AT 115 can have a high level of confidence that it is in proximity to the femtocell coverage area, and a scan for the FAP 230a can commence.

The scan for the FAP 230a can be implemented in different ways. For example, due to the OOB proxy 240a discovery by the AT's 115 OOB radio, both the AT 115 and the femto-proxy system 290a can be aware of each other's proximity. The AT 115 scans for the FAP 230a. Alternatively, the FAP 230a pages for the AT 115 (e.g., individually or as part of a multicast paging of all registered ATs 115), and the AT 115 listens for the page. When the scan for the FAP 230a is successful, the AT 115 can attach to the FAP 230a.

When the AT 115 is in the femtocell coverage area and attached to the FAP 230a, the AT 115 can be in communication with the macro communications network 100a via the FAP 230a. As described above, the AT 115 can also be a slave of a piconet for which the OOB proxy 240a acts as the master. For example, the piconet can operate using Bluetooth and can include Bluetooth communications links facilitated by a Bluetooth radio (e.g., implemented as part of the transceiver module 210) in the FAP 230a.

Examples of the FAP 230a have various configurations of base station or wireless access point equipment. As used herein, the FAP 230a can be a device that communicates with various terminals (e.g., client devices (ATs 115, etc.), proximity agent devices, etc.) and can also be referred to as, and include some or all the functionality of, a base station, a Node B, and/or other similar devices. Although referred to herein as the FAP 230a, the concepts herein are applicable to access point configurations other than femtocell configuration (e.g., picocells, microcells, etc.). Examples of the FAP 230a utilize communication frequencies and protocols native to a corresponding cellular network (e.g., the macro communications network 100a, or a portion thereof) to facilitate communication within a femtocell coverage area associated with the FAP 230a (e.g., to provide improved coverage of an area, to provide increased capacity, to provide increased bandwidth, etc.).

The FAP 230a can be in communication with other interfaces not explicitly shown in FIG. 2A. For example, the FAP 230a can be in communication with a native cellular interface as part of the transceiver module 210 (e.g., a specialized transceiver utilizing cellular network communication techniques that can consume relatively large amounts of power in operation) for communicating with various appropriately configured devices, such as the AT 115, through a native cellular wireless link (e.g., an "in band" communication link). Such a communication interface can operate according to various communication standards, including but not limited to wideband code division multiple access (W-CDMA), CDMA2000, global system for mobile telecommunication (GSM), worldwide interoperability for microwave access (WiMax), and wireless LAN (WLAN). Also or alternatively, the FAP 230a can be in communication with one or more backend network interfaces as part of the transceiver module 210 (e.g., a backhaul interface providing communication via the Internet, a packet switched network, a switched network, a radio network, a control network, a wired link, and/or the like) for communicating with various devices or other networks.

As described above, the FAP 230a can further be in communication with one or more OOB interfaces as part of the transceiver module 210 and/or the OOB proxy 240a. For example, the OOB interfaces can include transceivers that consume relatively low amounts of power in operation and/or can cause less interference in the in-band spectrum with respect to the in-band transceivers. Such an OOB interface can be utilized according to implementations to provide low power wireless communications with respect to various appropriately configured devices, such as an OOB radio of the AT 115. The OOB interface can, for example, provide a Bluetooth link, an ultra-wideband (UWB) link, an IEEE 802.11 (WLAN) link, etc.

The terms "high power" and "low power" as used herein are relative terms and do not imply a particular level of power consumption. Accordingly, OOB devices (e.g., OOB proxy 240a) can simply consume less power than native cellular interface (e.g., for macro WWAN communications) for a given time of operation. In some implementations, OOB interfaces also provide relatively lower bandwidth communications, relatively shorter range communication (e.g., ranges up to 30 meters), and/or consume relatively lower power in comparison to the macro communications interfaces. There is no limitation that the OOB devices and interfaces be low power, short range, and/or low bandwidth. Devices can use any suitable out-of-band link or channel, whether wireless or otherwise, such as IEEE 802.11, Bluetooth, Bluetooth LE, PEANUT, UWB, ZigBee, a wired link, etc.

OOB proxies 240a can provide various types of OOB functionality and can be implemented in various ways. An OOB proxy 240a can have any of various configurations, such as a stand-alone processor-based system, a processor-based system integrated with a host device (e.g., access point, gateway, router, switch, repeater, hub, concentrator, etc.), etc. For example, the OOB proxies 240a can include various types of interfaces for facilitating various types of communications.

Some OOB proxies 240a include one or more OOB interfaces as part of the transceiver module 210 (e.g., a transceiver that can consume relatively low amounts of power in operation and/or can cause less interference than in the in-band spectrum) for communicating with other appropriately configured devices (e.g., an AT 115) for providing interference mitigation and/or femtocell selection herein through a wireless link. One example of a suitable communication interface is a Bluetooth-compliant transceiver that uses a time-division duplex (TDD) scheme.

OOB proxies 240a can also include one or more backend network interfaces as part of the transceiver module 210 (e.g., packet switched network interface, switched network interface, radio network interface, control network interface, a wired link, and/or the like) for communicating with various devices or networks. An OOB proxy 240a that is integrated within a host device, such as with FAP 230a, can utilize an internal bus or other such communication interface in the alternative to a backend network interface to provide communications between the OOB proxy 240a and other devices, if desired. Additionally or alternatively, other interfaces, such as OOB interfaces, native cellular interfaces, etc., can be utilized to provide communication between the OOB proxy 240a and the FAP 230a and/or other devices or networks.

Various communications functions (e.g., including those of the FAP 230a and/or the OOB proxy 240a) can be managed using the communications management subsystem 250. For example, the communications management subsystem 250 can at least partially handle communications with the macro (e.g., WWAN) network, one or more OOB networks (e.g., piconets, AT 115 OOB radios, other femto-proxies, OOB beacons, etc.), one or more other femtocells (e.g., FAPs 230), ATs 115, etc. For example, the communications management subsystem 250 can be a component of the femto-proxy system 290a in communication with some or all of the other components of the femto-proxy system 290a via a bus.

Various other architectures are possible other than those illustrated by FIG. 2A. The FAP 230a and OOB proxy 240a can or can not be collocated, integrated into a single device, configured to share components, etc. For example, the femto-proxy system 290a of FIG. 2A has an integrated FAP 230a and OOB proxy 240a that at least partially share components, including the antennas 205, the transceiver module 210, the memory 215, and the processor module 225.

Figure 2B:
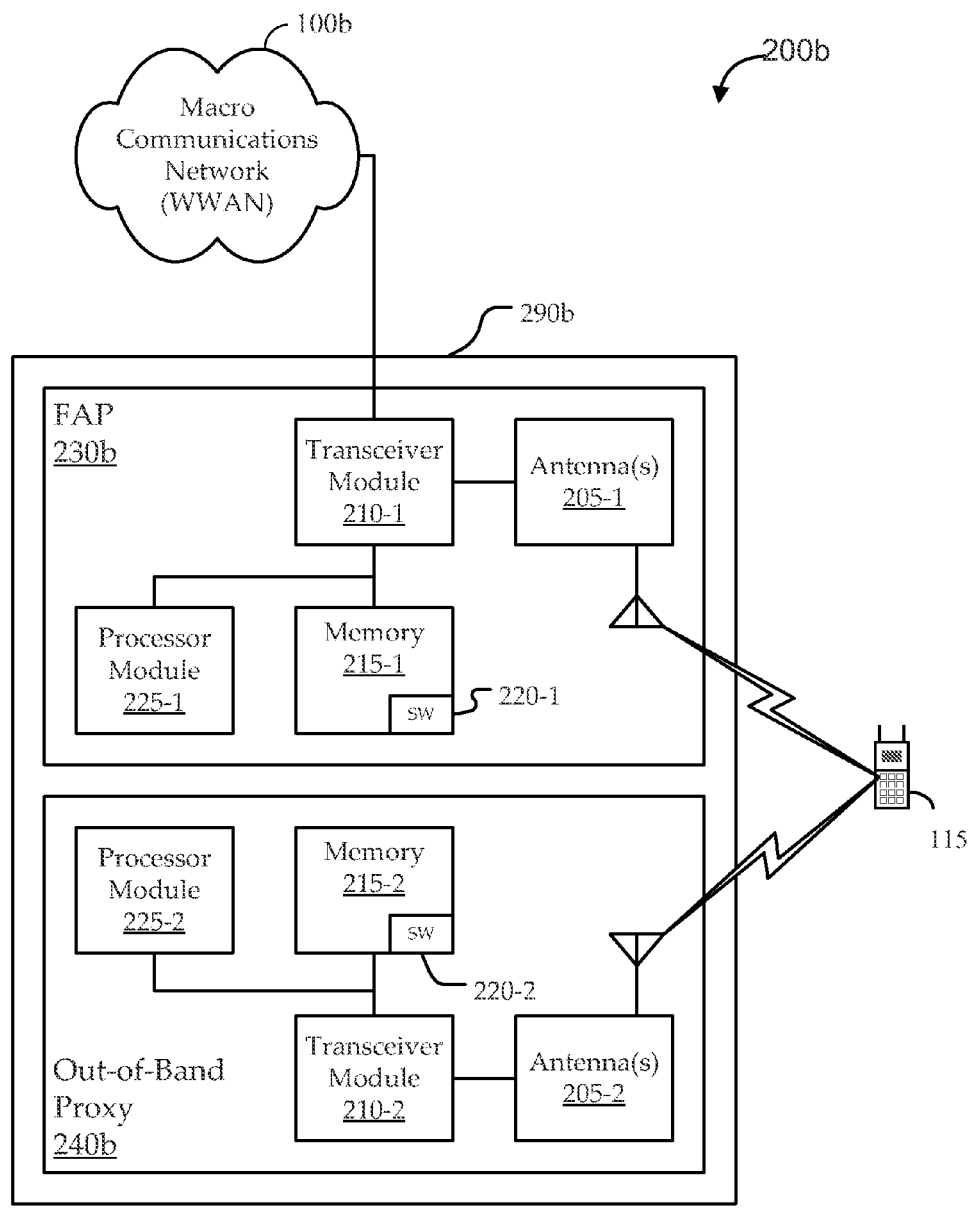
FIG. 2B is a block diagram of an exemplary wireless communications system that includes an architecture of a femto-proxy system that is different from the architecture shown in FIG. 2A.

FIG. 2B shows a block diagram of a wireless communications system 200b that includes an architecture of a femto-proxy system 290b that is different from the architecture shown in FIG. 2A. Similar to the femto-proxy system 290a, the femto-proxy system 290b includes an OOB proxy 240b and a FAP 230b. Unlike the system 290a, however, each of the OOB proxy 240b and the FAP 230b has its own antenna 205, transceiver module 210, memory 215, and processor module 225. Both transceiver modules 210 are configured to communicate bi-directionally, via their respective antennas 205, with ATs 115. The transceiver module 210-1 of the FAP 230b is illustrated in bi-directional communication with the macro communications network 100b (e.g., typically over a backhaul network).

For the sake of illustration, the femto-proxy system 290b is shown without a separate communications management subsystem 250. In some configurations, a communications management subsystem 250 is provided in both the OOB proxy 240b and the FAP 230b. In other configurations, the communications management subsystem 250 is implemented as part of the OOB proxy 240b. In still other configurations, functionality of the communications management subsystem 250 is implemented as a computer program product (e.g., stored as software 220-1 in memory 215-1) of one or both of the OOB proxy 240b and the FAP 230b.

Figure 3:
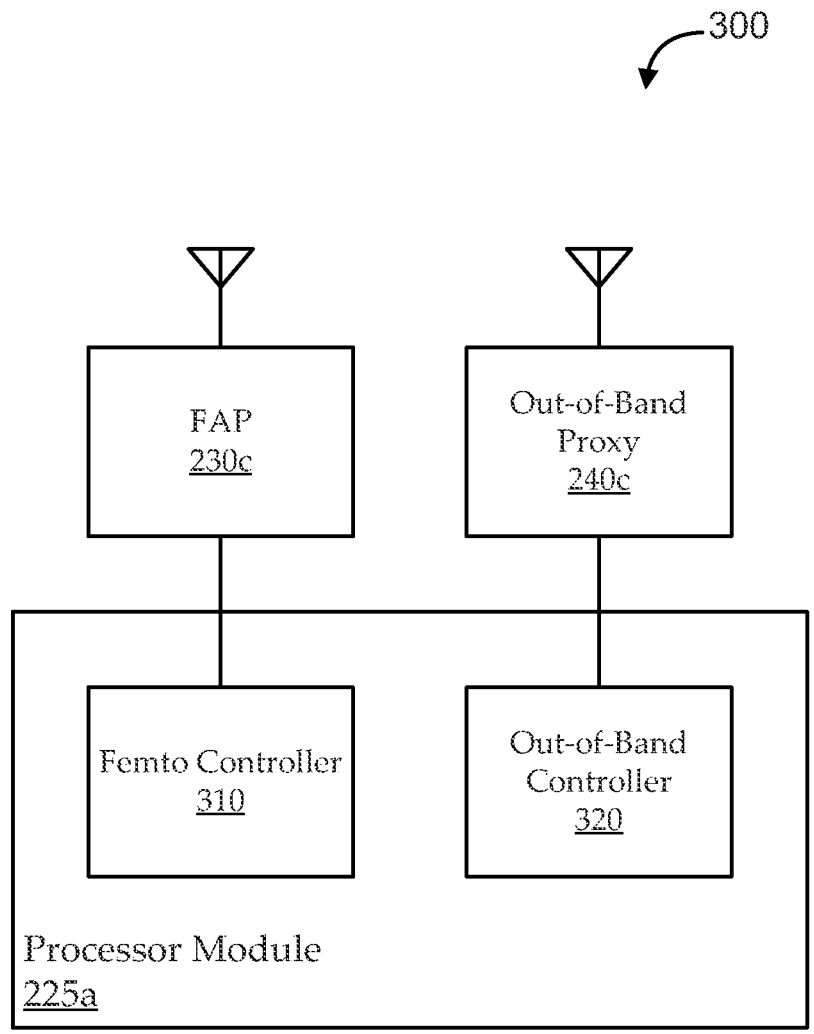
FIG. 3 is a block diagram of an example of a processor module for implementing functionality of a communications management subsystem shown in FIG. 2A.

In yet other configurations, some or all of the functionality of the communications management subsystem 250 is implemented as a component of the processor module 225. FIG. 3 shows a block diagram 300 of a processor module 225a for implementing functionality of the communications management subsystem 250. The processor module 225a includes a femto controller 310 and an OOB controller 320. The femto controller 310 is in communication with and directs certain functionality of the FAP 230c, while the OOB controller 320 is in communication with and directs certain functionality of the OOB proxy 240c. As described above, the FAP 230c can be a femtocell, and the OOB proxy 240c can be an OOB radio. As described more fully below, configurations of the OOB controller 320 detect proximity of authorized ATs 115 using the OOB proxy 240c to determine whether each AT 115 is in a coverage area associated with the FAP 230c.

Both the FAP 230a of FIG. 2A and the FAP 230b of FIG. 2B are illustrated as providing a communications link only to the macro communications network 100a. However, the FAP 230 can provide communications functionality via many different types of networks and/or topologies. For example, the FAP 230 can provide a wireless interface for a cellular telephone network, a cellular data network, a local area network (LAN), a metropolitan area network (MAN), a wide area network (WAN), the public switched telephone network (PSTN), the Internet, etc.

Figure 4A:
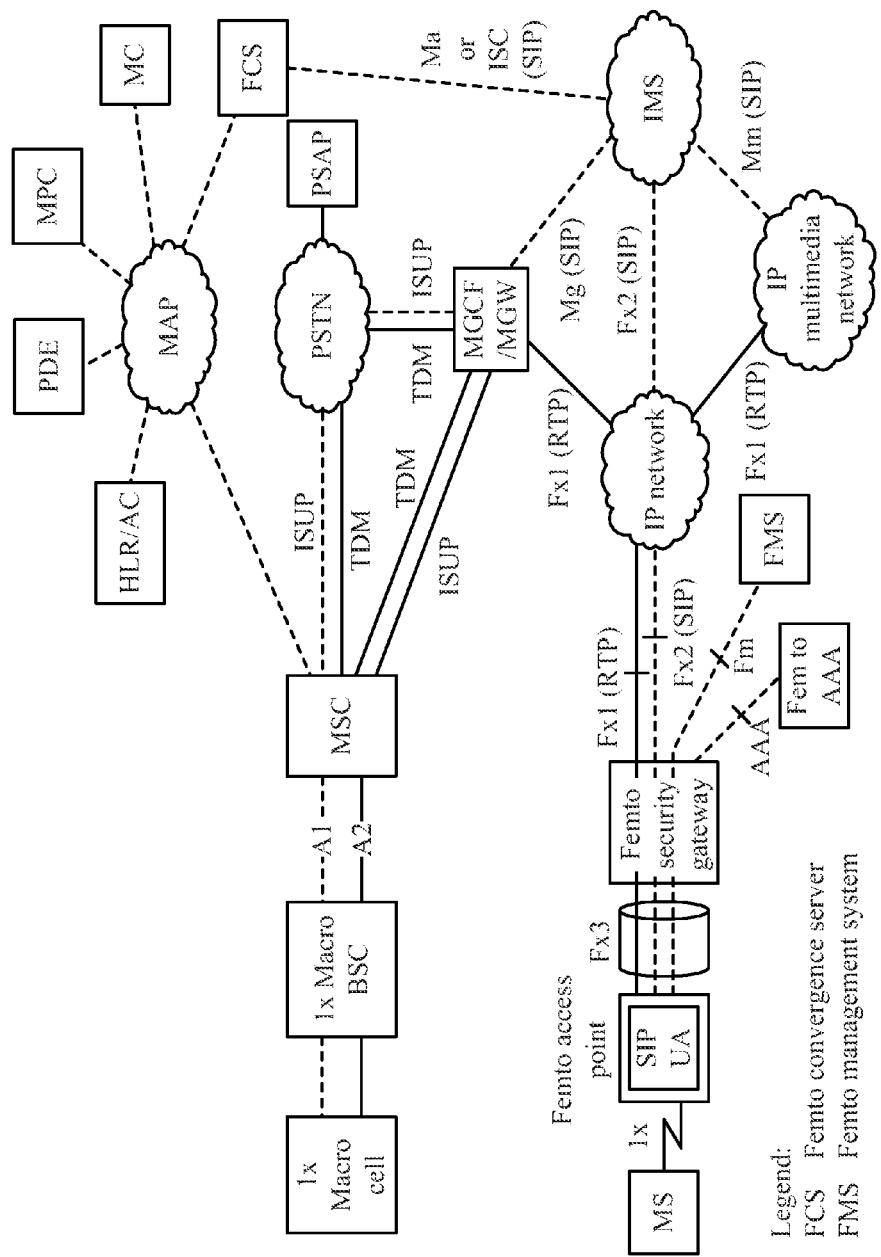
FIG. 4A shows detail regarding an example of a femtocell architecture for legacy circuit services, for example, for CDMA 1× networks.
Figure 4B:
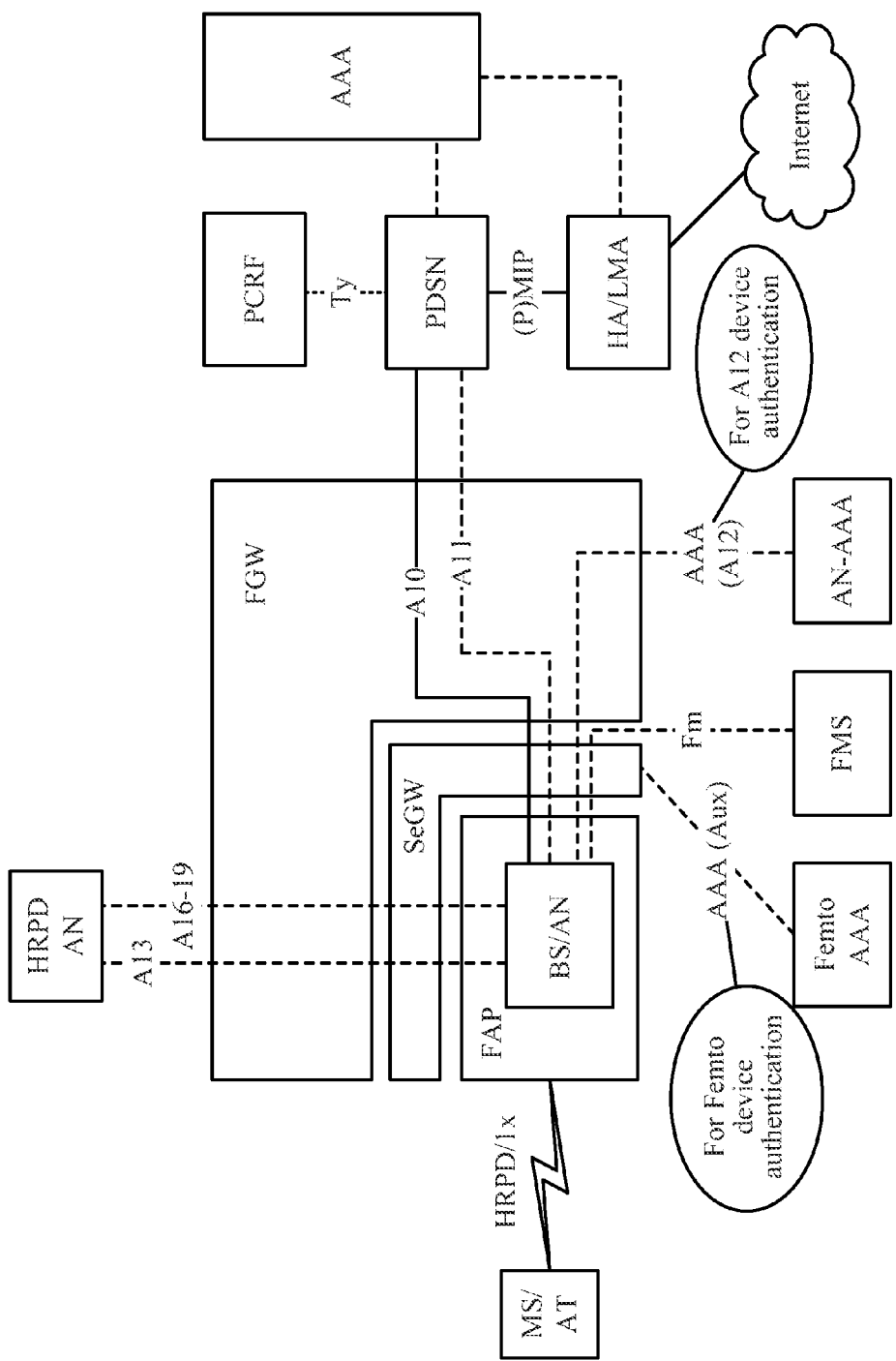
FIG. 4B shows detail regarding an example of a femtocell architecture for packet data service access using legacy interfaces, for example, for HRPD networks.

FIGS. 4A and 4B show further detail with respect to femtocell architecture in communication networks for providing various services. Specifically, FIG. 4A shows detail regarding an exemplary femtocell architecture for legacy circuit services. For example, the network of FIG. 4A can be a CDMA 1xX circuit switched services network. FIG. 4B shows detail regarding an exemplary femtocell architecture for packet data service access using legacy interfaces. For example, the network of FIG. 4B can be a 1x EV-DO (HRPD) packet data services network. These architectures illustrate possible portions of the communications systems and networks shown in FIGS. 1-3.

Figure 5:
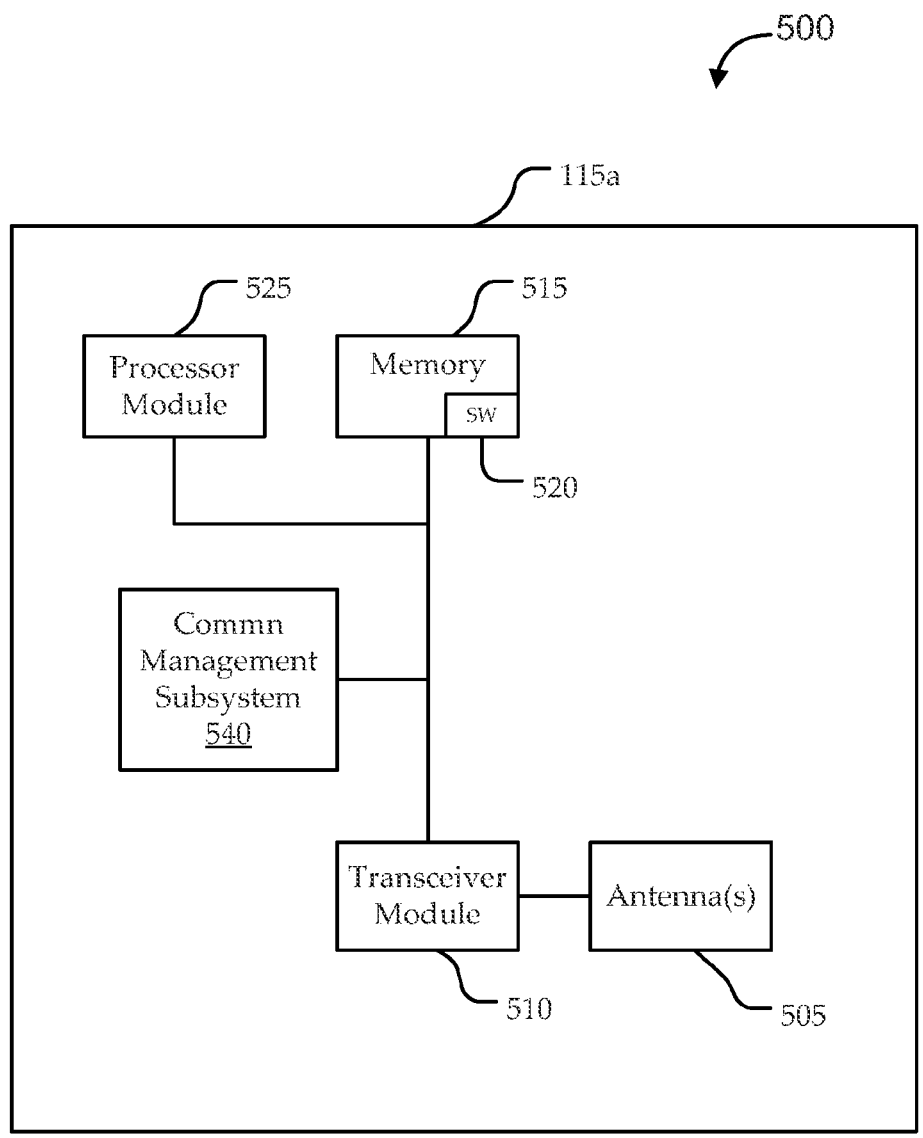
FIG. 5 is a block diagram of an example of a mobile access terminal for use with the femto-proxy systems of FIGS. 2A and 2B in the context of the communications systems and networks of FIGS. 1-4B.

As described above, the femto-proxy systems 290 are configured to communicate with client devices, including the ATs 115. FIG. 5 shows a block diagram 500 of a mobile access terminal (AT) 115a for use with the femto-proxy systems 290 of FIGS. 2A and 2B in the context of the communications systems and networks of FIGS. 1-4B. The AT 115a can have any of various configurations, such as personal computers (e.g., laptop computers, netbook computers, tablet computers, etc.), cellular telephones, PDAs, digital video recorders (DVRs), internet appliances, gaming consoles, e-readers, etc. For the purpose of clarity, the AT 115a is assumed to be provided in a mobile configuration, having an internal power supply (not shown), such as a small battery, to facilitate mobile operation.

The AT 115a includes antennas 505, a transceiver module 510, memory 515, and a processor module 525, which each can be in communication, directly or indirectly, with each other (e.g., via one or more buses). The transceiver module 510 is configured to communicate bi-directionally, via the antennas 505 and/or one or more wired or wireless links, with one or more networks, as described above. For example, the transceiver module 510 is configured to communicate bi-directionally with BTSs 105 of the macro communications network (e.g., the communications system 100 of FIG. 1), and, in particular, with at least one FAP 230.

As described above, the transceiver module 510 can be configured to further communicate over one or more OOB communications channels. For example, the transceiver module 510 communicates with a femto-proxy system 290 (e.g., as described with reference to FIGS. 2A and 2B) over both an in-band (e.g., macro) link to the FAP 230 and at least one OOB channel to the OOB proxy 240. The transceiver module 510 can include a modem configured to modulate the packets and provide the modulated packets to the antennas 505 for transmission, and to demodulate packets received from the antennas 505. While the AT 115a can include a single antenna 505, the AT 115a will typically include multiple antennas 505 for supporting multiple links or channels.

The memory 515 can include random access memory (RAM) and read-only memory (ROM). The memory 515 can store computer-readable, computer-executable software code 520 containing instructions that are configured to, when executed, cause the processor module 525 to perform various functions described herein (e.g., call processing, database management, message routing, etc.). Alternatively, the software 520 may not be directly executable by the processor module 525 but may be configured to cause the computer, when compiled and executed, to perform functions described herein. In some implementations, the memory 515 can store a group device address. The group device address can be in the same format as a unique device address (e.g., BD_ADDR) assigned to the AT 115a.

The processor module 525 can include an intelligent hardware device, for example, a central processing unit (CPU) such as those made by Intel® Corporation or AMD®, a microcontroller, an application specific integrated circuit (ASIC), etc. The processor module 525 can include a speech encoder (not shown) configured to receive audio via a microphone, convert the audio into packets (e.g., 30 ms in length) representative of the received audio, provide the audio packets to the transceiver module 510, and provide indications of whether a user is speaking Alternatively, an encoder can only provide packets to the transceiver module 510, with the provision or withholding/suppression of the packet itself providing the indication of whether a user is speaking.

According to the architecture of FIG. 5, the AT 115a further includes a communications management subsystem 540. The communications management subsystem 540 can manage communications with the macro (e.g., WWAN) network, one or more OOB networks (e.g., piconets, OOB proxies 240, etc.), one or more femtocells (e.g., FAPs 230), other ATs 115 (e.g., acting as a master of a secondary piconet), etc. For example, the communications management subsystem 540 can be a component of the AT 115a in communication with some or all of the other components of the AT 115a via a bus. Alternatively, functionality of the communications management subsystem 540 is implemented as a component of the transceiver module 510, as a computer program product, and/or as one or more controller elements of the processor module 525.

The AT 115a includes communications functionality for interfacing with both the macro (e.g., cellular) network and one or more OOB networks (e.g., the OOB proxy 240 channel). For example, some ATs 115 include native cellular interfaces as part of the transceiver module 510 or the communications management subsystem 540 (e.g., a transceiver utilizing cellular network communication techniques that consume relatively large amounts of power in operation) for communicating with other appropriately configured devices (e.g., for establishing a link with a macro communication network via FAP 230) through a native cellular wireless link. The native cellular interfaces can operate according to one or more communication standards, including, but not limited to, W-CDMA, CDMA2000, GSM, WiMax, and WLAN.

Furthermore, the ATs 115 can also include OOB interfaces implemented as part of the transceiver module 510 and/or the communications management subsystem 540 (e.g., a transceiver that can consume relatively low amounts of power in operation and/or can cause less interference than in the in-band spectrum) for communicating with other appropriately configured devices over a wireless link. One example of a suitable OOB communication interface is a Bluetooth-compliant transceiver that uses a time-division duplex (TDD) scheme. In certain implementations, the ATs 115 can scan for and be responsive to proximity request messages including either an associated group identifier or a unique identifier. The group identifier can be based on the group device address stored in, for example, the memory 515.

Out-of-Band Paging Implementations

In a typical femto deployment, multiple ATs 115 can be authorized to communicate with a FAP 230 according to an access control list (ACL) maintained by the FAP 230. In order to maintain communications links with those ATs 115 as appropriate (e.g., to facilitate idle macro-to-femto handoffs, active macro-to-femto hand-ins, etc.), the FAP 230 can determine when an authorized AT 115 enters or leaves a coverage area associated with the FAP 230 by monitoring each AT's 115 proximity to the FAP 230.

Notably, the WWAN link between the FAP 230 and each AT 115 is negotiated according to a managed network protocol, such that timing and/or other parameters of the communications are negotiated. Accordingly, using WWAN (e.g., cellular) techniques to monitor proximity can allow exploitation of the negotiated parameters for the sake of for fairness, efficiency, etc. However, using the WWAN link for proximity detection by configuring the AT 115 to send periodic registrations to the FAP 230 can also undesirably impact battery life of the AT 115. Also, this can be configured only after the AT 115 has performed handoff to the FAP 230. In some configurations, the approach might detect when the AT 115 entered a femto coverage area precisely but not when the AT 115 has exited the femto coverage area.

As described above, a femto-proxy system 290 provides both in-band and out-of-band (OOB) functionality through its integrated FAP 230 and OOB proxy 240, respectively. Exemplary femto-proxy 290 implementations use the OOB proxy 240 to detect proximity of each AT 115 in an access control list of its associated FAP 230 to help facilitate establishment or termination of WWAN links between the FAP 230 and the ATs 115, as appropriate. For example, the OOB proxy 240 can periodically multicast proximity request messages to each AT 115 and wait for proximity response messages or a timeout condition indicating whether each AT 115 is in proximity.

Figure 6:
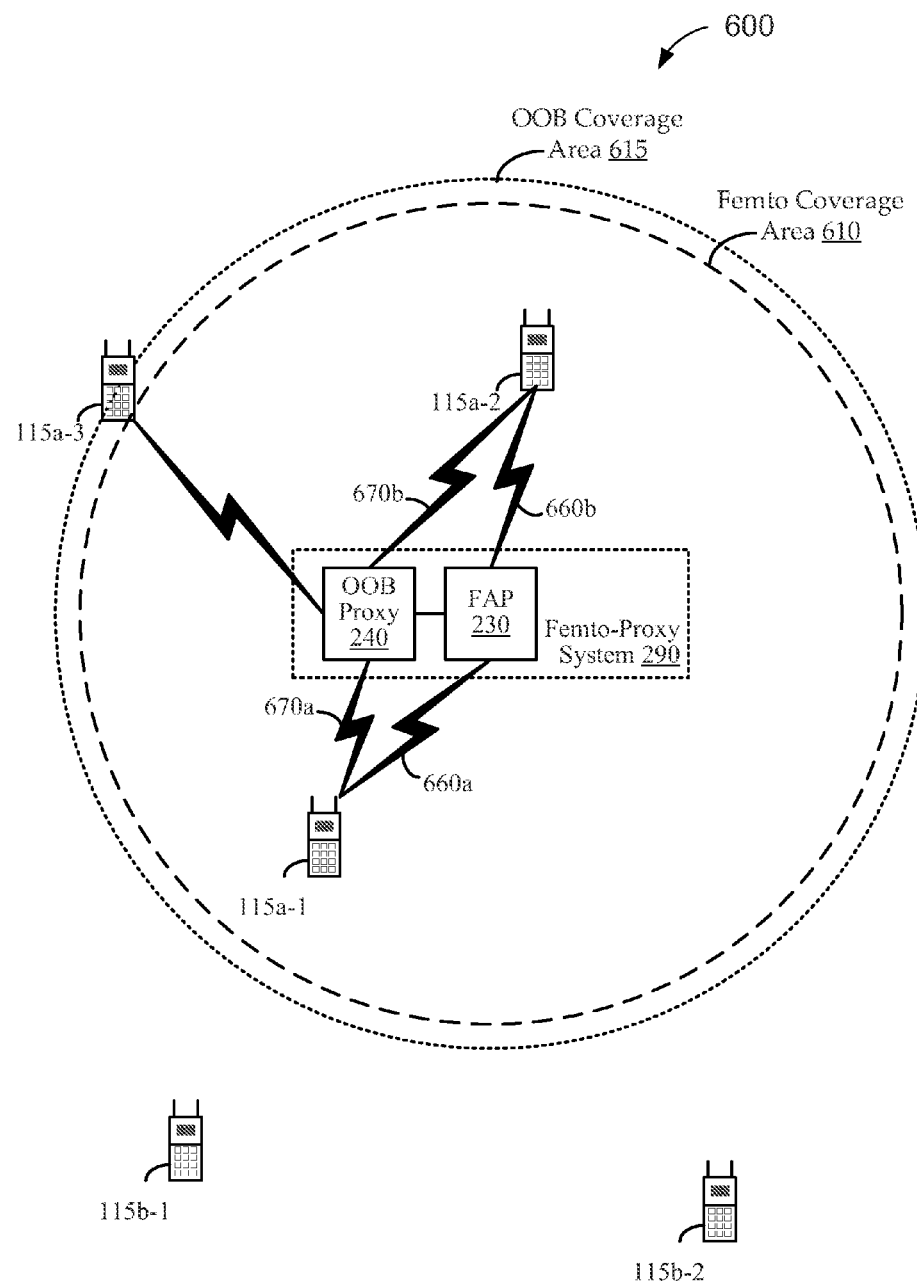
FIG. 6 is a simplified network environment illustrating an exemplary scenario in which multiple ATs are in different locations and communication states with respect to a femto-proxy system.

Turning to FIG. 6, a simplified network environment 600 illustrates an exemplary scenario in which multiple ATs 115 are in different locations and communication states with respect to a femto-proxy system 290. The femto-proxy system 290 is shown in simplified form as a FAP 230 integrated with an OOB proxy 240. A femto coverage area 610 is illustrated around the FAP 230, and five ATs 115 are shown in various locations with respect to the femto coverage area 610. It will be appreciated that the locations, numbers, sizes, and other aspects of the illustrated elements in FIG. 6 are intended to be illustrative only, and should not be construed as limiting the scope of the disclosure or the claims.

Among the ATs 115 illustrated in FIG. 6, a first subset of ATs 115*a* is considered "in proximity" to the FAP 230 for the sake of this disclosure. Some ATs 115*a* in proximity to the FAP 230 can be in an active communications mode while attached to the FAP 230, such that each has an established in-band link 660 with the FAP 230. Other ATs 115*a* in proximity to the FAP 230 are in an inactive (or idle) communications mode while attached to the FAP 230 (e.g., the FAP 230 periodically monitors overhead and paging channels, but no in-band link 660 is maintained).

A second subset of ATs 115*b* is considered "out of proximity" or "not in proximity" to the FAP 230 for the sake of this disclosure. For example, AT 115*b*-1 and AT 115*b*-2 are shown completely outside the femto coverage area 610 (e.g., and outside the range of the OOB proxy 240, as described below). As both of the second subset of ATs 115*b* are out of proximity to the FAP 230 and outside both the femto coverage area 610 and the OOB coverage area 615, neither can have an established in-band link 660 with the FAP 230 or an established OOB channel 670 with the OOB proxy 240, and both are out of range to receive any OOB messaging (e.g., proximity request messages).

Regarding the first subset of ATs 115*a*, AT 115*a*-1 and AT 115*a*-2 are assumed to be within the femto coverage area 610, attached to the FAP 230, and in an active communications mode. Accordingly, each is in communication with the femto-proxy system 290 over at least an in-band (e.g., WWAN, cellular) link 660 with the FAP 230. As described above, the in-band link 660 can be used to facilitate macro communications with the ATs 115.

For the sake of illustration, an OOB coverage area 615 is also shown. For example, the OOB coverage area 615 can be dictated by the OOB range (e.g., the Bluetooth range). Configurations of the ATs 115 are configured to be in communication with the OOB proxy 240 of the femto-proxy system 290 over an OOB (e.g., Bluetooth) channel 670. In some implementations, the OOB channel 670 is a predetermined frequency or set of frequencies (e.g., a range of contiguous frequencies or a set on non-contiguous frequencies) over which OOB communications occur. During paging and/or other types of communications, it can be unnecessary to establish an OOB link over the OOB channel 670.

For example, some of the ATs 115*a* in proximity are in communication with the OOB proxy 240 using periodic proximity request and response messages. Other of the ATs 115*a* in proximity can have an OOB link established over the OOB channel 670. In another example, the OOB link is established over the OOB channel 670 to provide supplemental communications functionality (e.g., proximity detection, supplemental bandwidth, etc.).

Typically, the OOB coverage area 615 is configured to be substantially coextensive with the femto coverage area 610 (e.g., the difference in coverage area illustrated in FIG. 6 is exaggerated for the sake of clarity). For example, when the two coverage areas are substantially coextensive, OOB proximity detection can reliably indicate presence within the femto coverage area 610 (i.e., and proximity to the FAP 230). Accordingly, an AT 115 can be discovered by the OOB proxy 240 over an OOB channel 670 when the AT 115 is immediately outside or within the femto coverage area 610. To illustrate this case, AT 115*a*-3 is shown as being located just outside the femto coverage area 610 and having no established in-band link 660 with the FAP 230; but still being within the OOB range and having an established OOB channel 670 with the OOB proxy 240.

For example, when the AT 115*a*-3 approaches the femto coverage area 610 (e.g., but has not yet entered the femto coverage area 610), the AT 115 receives a proximity request message (e.g., a Bluetooth paging message) from the OOB proxy 240 and responds with a proximity response message to the OOB proxy 240. Having discovered the AT 115 over the OOB channel 670, the FAP 230 can be informed that it is highly likely that the AT 115 is in proximity to the FAP 230. Accordingly, a scan can commence (e.g., at the AT 115 or the FAP 230) over an in-band channel, so that the AT 115 and the FAP 230 can discover each other. If the AT 115 is in active communications, when the scan is successful (e.g., when the AT 115 is within the femto coverage area 610), an in-band link 660 can be established between the AT 115 and the FAP 230, when appropriate.

Examples of processes that can be used in the detection of access terminals in proximity to a femtocell will now be described.

Figure 7:
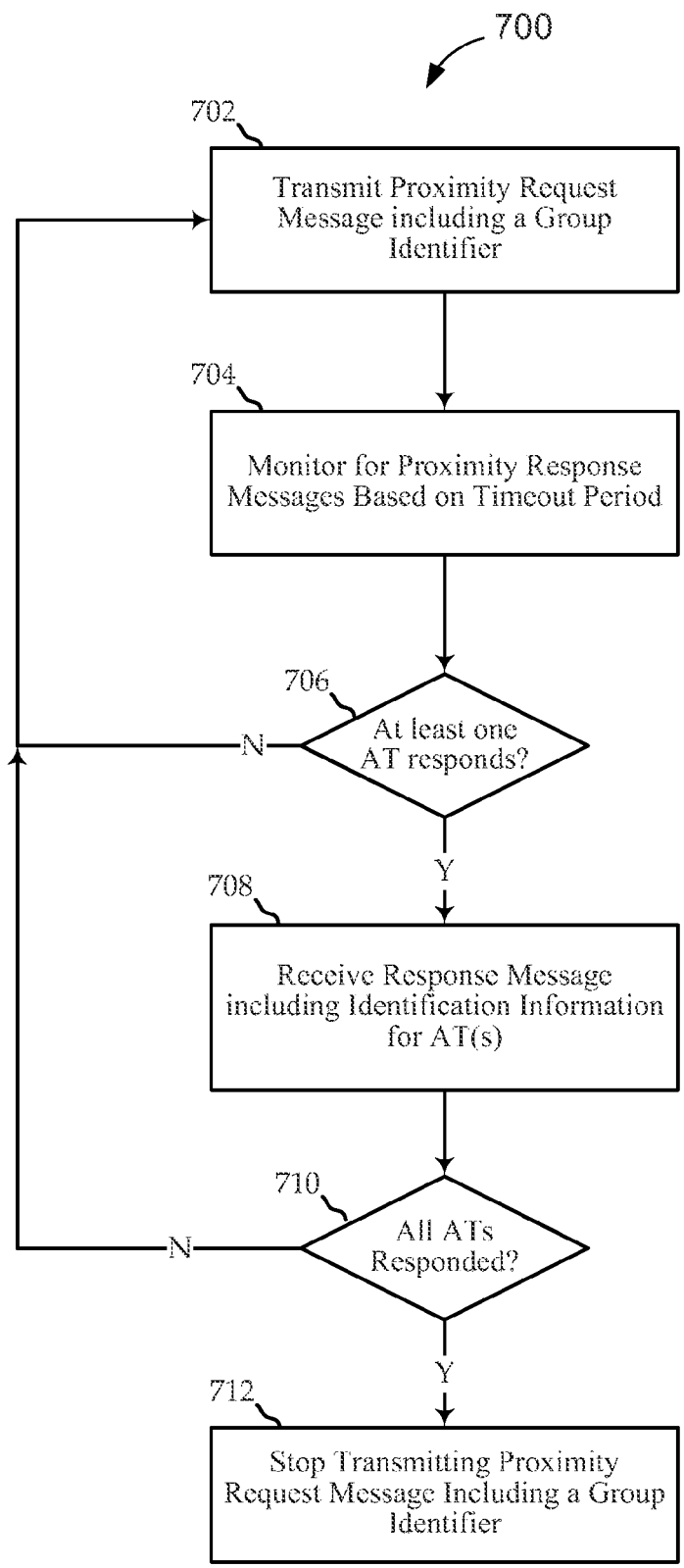
FIG. 7 is a block flow diagram of a process for multicasting a proximity request message by a femto-proxy system to access terminals in proximity of the femto-proxy system.

Referring to FIG. 7, with further reference to FIGS. 1-6, a process 700 for multicasting a proximity request message to access terminals in proximity to a femto-proxy system includes the stages shown. The process 700 can be performed by, e.g., the femto-proxy system 290 of FIG. 6. The process 700 is an example only and not limiting. Many variations to the process 700 are possible without departing from the scope of the disclosure or the claims. For example, the process 700 can be altered, e.g., by having stages added, removed, rearranged, combined, and/or performed concurrently.

The process 700 begins at stage 702 with the transmission of a directed proximity request message to multiple access terminals over an out-of-band (OOB) communications channel using an OOB radio. For example, the FAP 230 of the femto-proxy system 290 can maintain an access control list (ACL) in memory that indicates a set of ATs 115 that are authorized to communicate (e.g., with the macro communications network) via the femtocell. The OOB proxy 240 of the femto-proxy system 290 can transmit directed proximity request messages to the set of ATs 115 in order to determine those access terminals that are in proximity. The proximity request messages can be directed in the sense that the messages are directly addressed to the set of ATs 115 rather than broadcasted to all devices (e.g. a broadcasted message is readable by any device using the same communication protocol). In one illustrative configuration, the OOB proxy 240 can be implemented as a Bluetooth module configured to communicate paging messages to each AT 115.

In some implementations, a proximity request message includes a group identifier associated with each AT 115. The group identifier indicates to an AT 115 receiving the proximity request message that the message is addressed to the AT 115. Thus, by including the group identifier, a transmitted proximity request message can be multicast or addressed to each of the ATs 115.

In some implementations, a proximity request message can be transmitted over several different OOB communications channels (e.g., transmissions containing the same group identifier sent over multiple OOB communications channels). The ATs 115 preferably scan for proximity request messages over different communications channels to receive the message regardless of the channel used.

At stage 704, one or more OOB communications channels are monitored for proximity response messages. In some implementations, the OOB communications channels are monitored for a predefined timeout period. During this period, the access terminals 115 are given sufficient time to receive and respond to the proximity request message transmitted at 702.

At stage 706, a determination is made as to whether any of the ATs 115 have responded to the proximity request message communicated at stage 702. In the event no ATs 115 respond, a proximity request message including the group identifier can again be transmitted at stage 702. In the event at least one AT 115 responds, proximity response messages are received from the responding ATs 115 over one or more OOB communications channel at stage 708. Receipt of the proximity response messages indicate that the responding ATs 115 are in proximity to the FAP 230. For example, as described above, the femto-proxy system 290 is configured so that the OOB range is substantially coextensive with (e.g., or at least as large as) the femto coverage area 610, such that detection of the AT 115 over the OOB communications channel indicates that the AT 115 is within the OOB range and thus in proximity to the FAP 230.

In some implementations, after receiving a first proximity response message, monitoring for responses can continue so that additional responses can be received. Any received response messages are processed in a manner similar to the first received proximity response message (e.g., identification information can be processed to determine the identity of the responding access terminal, determination that the responding access terminal is in proximity, etc.). Monitoring can occur until the timeout period expires. Thereafter, any ATs 115 that have not responded are deemed to not be in proximity.

In some implementations, a received proximity response can include identification information for the responding AT 115. The identification information can include, for instance, a unique device access code associated with the responding AT 115. Based on the identification information, the identity of the responding AT 115 can be determined. For example, a lookup table or similar data structure can be used to match the identification information with a specific access terminal in the FAP's ACL.

At stage 710, a determination is made as to whether each of the ATs 115 in FAP's 230 ACL have responded. If not all of the ATs 115 have responded, a proximity request including the group identifier can again be transmitted at stage 702. If all the ATs 115 have responded, transmission of proximity request messages including the group identifier can be stopped at stage 712. In some embodiments, paging can still periodically occur thereafter so as to continue to detect whether each detected AT 115 is in proximity to FAP 230. However, the paging can be performed at less frequent intervals. In some embodiments, such subsequent paging can be performed on an individual basis rather than as a group. For example, the ATs 115 can each be individually paged in a round robin fashion.

Figure 8:
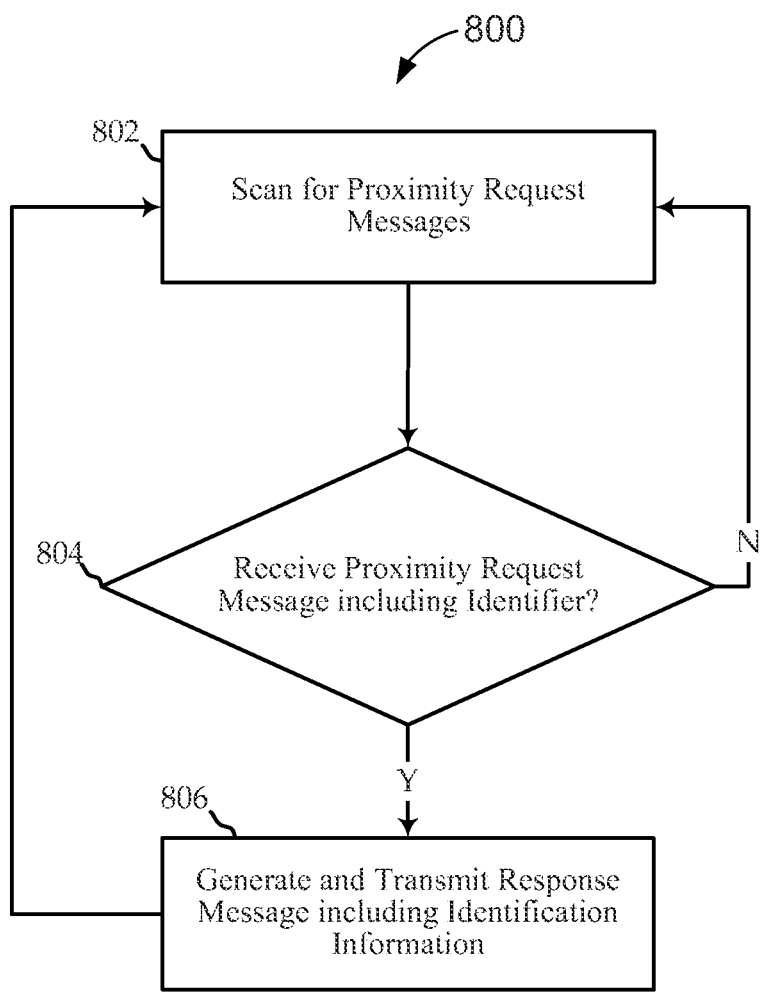
FIG. 8 is a block flow diagram of a process for receiving and responding to a proximity request message by an access terminal.

Turning to FIG. 8, with further reference to FIGS. 1-6, a process for responding to a proximity request message includes the stages shown. The process 800 can be performed by, e.g., any of the ATs 115 of FIG. 6. The process 800 is an example only and not limiting. Many variations to the process 800 are possible without departing from the scope of the disclosure or the claims. For example, the process 800 can be altered, e.g., by having stages added, removed, rearranged, combined, and/or performed concurrently.

The process 800 begins at stage 802 with a scan for directed proximity request messages over an OOB communications channel. For example, a proximity request message scan state can be periodically entered. While in the scan state, a designated OOB communications channel is monitored, or listened to, for proximity request messages.

At stage 804, a determination is made as to whether a proximity request message including an identifier has been received over the OOB communications channel. In some embodiments, a proximity request message can only be received if the identifier is a unique or group identifier associated with the AT 115. If a proximity request has been received at stage 804, a proximity response message is generated and transmitted at stage 806. In some embodiments, the proximity response message can include identification information for the AT 115.

As discussed, some implementations enable the detection of access terminals in proximity to a femtocell using Bluetooth technology. In general, Bluetooth is a short-range wireless technology that enables devices to efficiently communicate over short distances. In order for devices to be configured for operation with one another, a connection procedure typically is undertaken. Such a procedure includes an inquiry procedure and a subsequent paging procedure. Certain implementations described herein provide an extension of the paging procedure to facilitate reliable and efficient proximity detection.

As discussed, the Bluetooth paging procedure is used to establish a connection between two Bluetooth enabled devices. In particular, a potential master device uses the procedure to page a potential slave device that the master device wants to connect with. Before now, an individual Bluetooth paging procedure could only be used to page a single device. Such is the case because the Bluetooth protocol does not permit the paging of multiple devices through, for example, multicasting. In order to page more than one device, separate paging procedures are conducted with each individual device. In particular, individual paging messages are transmitted to each specific device using a device access code derived from the device's uniquely assigned device address (e.g., BDADDR).

In the context of proximity detection, individually performing a paging procedure with each access terminal in a femtocell's ACL can result in unacceptably high latency. Illustratively, a particular femtocell's ACL can include ten access terminals. In order to determine whether each access terminal is in proximity, ten separate and sequential paging procedures would have to be conducted. Each paging procedure would involve the transmission of a number of paging messages addressed to a specific access terminal over a predefined page timeout period. The page timeout period, in general, enables a paged access terminal sufficient time to respond to the paging messages. Illustratively, an individual paging procedure may include a 5 second timeout period. As a result, during the paging procedure, paging messages addressed to an individual access terminal would be continuously transmitted for 5 seconds. Because each paging procedure must last at least the duration of a timeout period, sequentially determining the proximity of each access terminal in a femtocell's ACL can require a lengthy period of time. For example, in the present example, it might take up to 50 seconds.

At least some techniques discussed herein can improve proximity detection latency, e.g., by providing multicasting (e.g., sending of a directed paging message to more than one access terminal) in Bluetooth. In doing so, multiple access terminals can be paged simultaneously or during a single paging procedure. By reducing the number of required paging procedures, latency associated with proximity detection can be significantly reduced.

In some implementations, a group Bluetooth device address can be used for paging. In particular, each access terminal in a femtocell's ACL can be configured to be responsive to paging messages that include a group device access code (GDAC) derived from the group Bluetooth device address. Each access terminal can also be configured to be responsive to messages that include a unique device access code derived from its unique Bluetooth device address. By configuring access terminals to be responsive to both group and unique DACs, implementations enable the terminals to receive paging messages according to the multicasting techniques described herein while still maintaining compatibility with conventional Bluetooth devices. Illustratively, implementations enable an access terminal to respond to paging messages addressed to multiple devices while continuing to allow the access terminal to connect with a conventional Bluetooth wireless headset.

Figure 9:
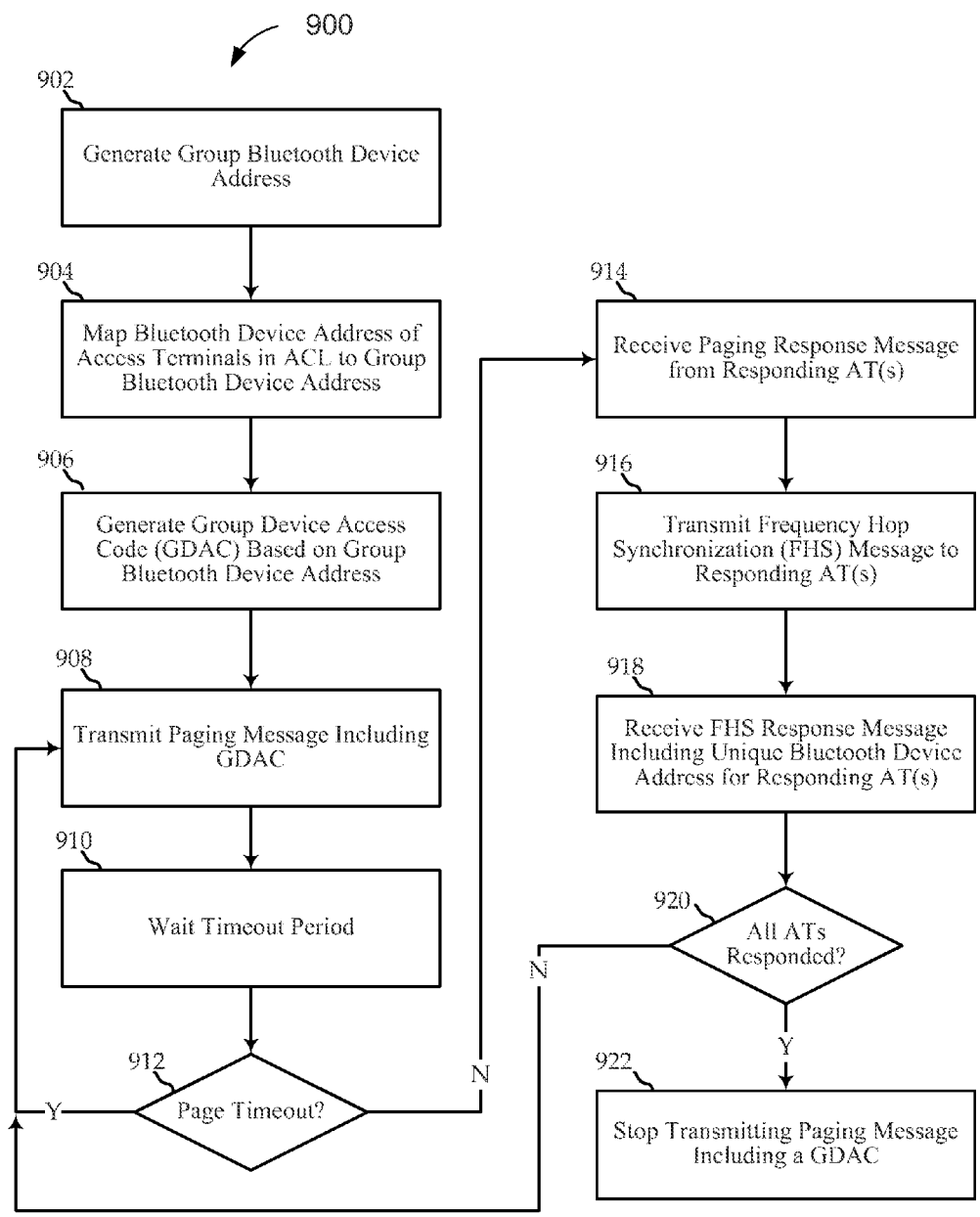
FIG. 9 is a block flow diagram of a process for paging multiple access terminals by a femto-proxy system in proximity to the femto-proxy system using Bluetooth.
Figure 10:
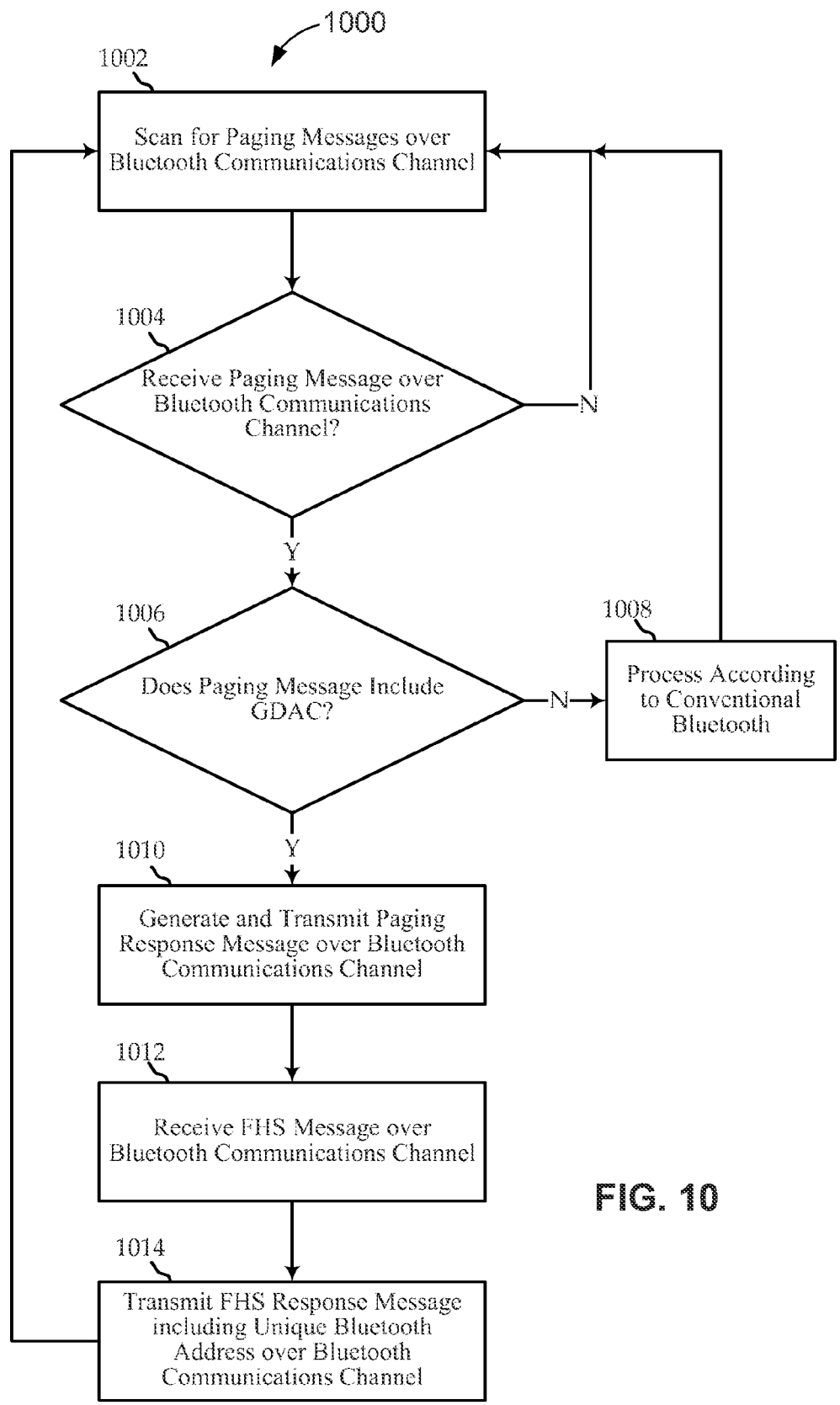
FIG. 10 is a block flow diagram of a process for receiving and responding to a paging message using Bluetooth by an access terminal.

Referring to FIGS. 9 and 10, block flow diagrams are illustrated that show processes for supporting proximity detection using a short-range wireless protocol, here Bluetooth technology. In particular, the processes shown in FIGS. 9 and 10 illustrate the transmission and receipt of Bluetooth paging messages that are multicast to one or more access terminals.

Turning to FIG. 9, with further reference to FIGS. 1-6, a process 900 for paging access terminals in proximity to a femto-proxy system using Bluetooth includes the stages shown. Process 900 can be performed by, e.g., the femto-proxy system 290 of FIG. 6. The process 900 is an example only and not limiting. Many variations to the process 900 are possible without departing from the scope of the disclosure or the claims. For example, the process 900 can be altered, e.g., by having stages added, removed, rearranged, combined, and/or performed concurrently.

The process 900 begins at stage 902 with the generation of a group Bluetooth device address. In some implementations, the group Bluetooth device address can be generated using a suitable mapping function or algorithm. The mapping function can, in some implementations, account for the unique Bluetooth device address of each AT 115 in FAP's 230 ACL. In doing so, the mapping function can avoid generating a group Bluetooth device address that matches a unique Bluetooth device address for an individual AT 115.

In some implementations, the mapping function can additionally be such that the probability that a generated group address matches a nearby device's unique Bluetooth device address is relatively low. For example, the mapping function can take into account the geographic location of the FAP 230, the current range of addresses assigned by the IEEE Registration Authority, etc. Illustratively, the mapping function can take into account that devices with addresses within a certain range are typically not sold in the region where the FAP 230 is currently deployed. As such, the mapping function might more likely generate group Bluetooth device addresses within the range of addresses.

By using a suitable mapping function, the chances of a paging collision can be significantly reduced. For example, a wireless computer keyboard might be assigned a unique Bluetooth device address during manufacturing. Because the keyboard is not a mobile phone or similar device, the keyboard might not be listed on the FAP's 230 ACL. However, if a group Bluetooth device address matching the keyboard's Bluetooth device address is inadvertently generated, the OOB proxy 240 and keyboard might erroneously establish a connection with one another. By using a suitable mapping function, such a situation can be avoided.

In certain implementations, the group Bluetooth device address can be the same format as a conventional Bluetooth device address (e.g., BD_ADDR). For example, the group Bluetooth device address can be 48 bits in length. The address can additionally contain three different fields: a lower address part containing 24 bits, an upper address part containing 8 bits, and a non-significant address part containing 16 bits.

At stage 904, the generated group Bluetooth device address can be mapped to each AT 115 in the FAP's 230 ACL. In some implementations, the group Bluetooth device address can be provided to the ATs 115 in the FAP's 230 ACL in any suitable manner. For example, a group Bluetooth device address can be transmitted to each AT 115 via an in-band link between the FAP 230 and the ATs 115. Thereafter, the OOB proxy 240 can page the ATs 115 based on the group Bluetooth device address. In some implementations, the OOB proxy 240 can be configured to periodically (e.g., according to a schedule or interval) or continuously page the ATs 115 in the FAP's 230 access control list in order to determine whether the terminals are in proximity.

At stage 906, the OOB proxy 240 generates a group device access code (GDAC). The GDAC, in some implementations, can be generated based on the group Bluetooth device address established at stage 902. For example, the GDAC can be derived from the lower address part of the group Bluetooth device address. The GDAC can be used to address a paging message to the ATs 115.

At stage 908, the OOB proxy 240 initiates a paging procedure by transmitting a directed paging message including the GDAC to one or more nearby access terminals over a Bluetooth communications channel. In some implementations, the paging message can be a packet that includes only the GDAC. In certain implementations, the paging message can be transmitted over a number of different Bluetooth communications channels. For example, the OOB proxy 240 can transmit the paging message over 32 different Bluetooth hop channels. By transmitting the paging message over several different communications channels, the probability that an AT 115 receives the paging message can be increased. In some implementations, the OOB proxy 240 transmits the paging message at a hop rate of 3200 hops/sec.

At stage 910, the OOB proxy 240 waits a predefined page timeout period to receive a response message from at least one of the ATs 115. During the page timeout period, the OOB proxy 240 can, in some implementations, continuously transmit paging messages. In some implementations, the page timeout period can be a time period within the range of 0.625 milliseconds and 40.9 seconds. Illustratively, a page timeout period can be a 5.12 second time period.

At stage 912, a determination is made as to whether the page timeout period has expired without the OOB proxy 240 receiving a response message. In some implementations, if the page timeout period has expired without the OOB proxy 240 receiving a response, the OOB proxy ends the current paging procedure. In certain implementations, not receiving a response message within a page timeout period indicates that no ATs 115 are currently in proximity.

In some implementations, the OOB proxy 240 can initiate another paging procedure during a subsequent paging interval at stage 908 by transmitting a paging message. Illustratively, the OOB proxy 240 can be configured to page the ATs 115 at 5 second intervals. The OOB proxy 240 can additionally be configured to continuously transmit paging messages for a 3 second timeout period. Based on this configuration, the OOB proxy 240 can multicast an initial paging message during a first 5 second interval, and continuously transmit additional paging messages during the associated 3 second timeout period. If the 3 second timeout period expires without a response, the OOB proxy 240 ends the current paging procedure. At the next 5 second interval (i.e., 2 seconds later), the OOB proxy 240 can, once again, initiate a paging procedure by multicasting an initial paging message.

At stage 914, a page response message is received from at least one responding AT 115 over one or more Bluetooth communications channels. Receipt of a page response message indicates that a responding AT 115 is in proximity to the FAP 230.

In certain implementations, a received page response message can include the unique DAC for the responding AT. The unique DAC can be used to determine the identity of the responding AT. In particular, the femto-proxy system 290 can maintain, for example, a mapping between each AT's 115 unique Bluetooth device address and the AT's 115 unique DAC. As a result, upon receiving a page response message including a unique DAC, femto-proxy system 290 can identify the unique Bluetooth device address associated with the DAC. Based on the identified unique Bluetooth device address, the specific identity of the responding AT 115 can thereafter be determined. In other implementations, as will be described, the identity of a responding AT can be determined using information included in an FHS response message received from a responding AT 115.

In some implementations, the OOB proxy 240 processes a received page response message before the end of a page timeout period. However, the OOB proxy 240 can continue to monitor for additional page responses from other ATs 115 for the duration of the page timeout period. In doing so, the OOB proxy 240 is able to receive additional responses from other ATs 115 that are in proximity.

For example, a page timeout period can be set to 5 seconds. Two seconds into the period, the OOB proxy 240 receives a page response message from an access terminal. Following receipt of the page response message, the OOB proxy 240 proceeds to process the received response. The OOB proxy 240 additionally continues monitoring for additional page response messages from other access terminals until the page timeout period ends after 5 seconds. If any additional response messages are received, the responses are processed in a manner similar to the processing of the first received response (e.g., frequency hopping synchronization messages and unique Bluetooth device addresses can be exchanged, etc.).

Once a page timeout period expires, any addressed ATs 115 that have not responded are deemed to not be in proximity of the femto-proxy system 290.

At stage 916, the OOB proxy 240 transmits a frequency hopping synchronization (FHS) message to each responding AT 115 over one or more Bluetooth communications channels. An individual FHS message can include any necessary information for establishing a connection with an addressed AT 115. For example, an FHS message can include real-time clock information, the Bluetooth device address of the OOB proxy 240, etc. After sending the FHS messages, the OOB proxy 240 receives an FHS response message from each responding AT 115 over one or more Bluetooth communications channels at stage 918. In some implementations, each individual FHS response message can include the unique Bluetooth device address for the responding AT 115. As discussed, a Bluetooth device address can enable the FAP 230 to identify a specific AT 115 that has responded to the paging message.

Following identification of the specific ATs 115 that are in proximity, femto-proxy system 290 can use such information to perform various processing. For example, proximity indications can be communicated to the core network (e.g., to the femto gateway, a femto convergence server, or other similar core network element) to facilitate active hand-in for ATs that are in proximity. As another example, femto-proxy system 290 can perform a blossoming procedure (e.g., increase the transmit power of FAP 230), which can mitigate interference. As a further example, femto-proxy system 290 can use the information to detect WWAN idle mode presence. As still another example, femto-proxy system 290 can, based on the information, take measures to conserve energy.

At stage 920, a determination is made as to whether each of the ATs 115 in FAP's 230 ACL has responded. If not all of the ATs 115 have responded, a paging message including the GDAC can again be transmitted as part of a paging procedure at stage 908. If all the ATs 115 have responded, the transmission of the paging messages can stop at stage 922. In some embodiments, paging can still periodically occur so as to continue to detect whether each detected AT 115 is in proximity to FAP 230. However, the paging can be performed at less frequent intervals. In some embodiments, such subsequent paging can be performed on an individual basis (e.g., each AT 115 is paged individually using a paging message including its unique DAC) rather than as a group. For example, the ATs 115 can each be individually paged in a round robin fashion.

In some implementations, the gaps between successive paging procedures can be used by the FAP 230 and/or the OOB proxy 240 to schedule slots for other processing. For example, the OOB proxy 240 can be configured to page access terminals in 20 second intervals. Each paging procedure can require up to 5 seconds. As such, there can be up to a 15 second time period where the OOB proxy 240 is not performing a paging procedure. During this time, the FAP 230 and/or the OOB proxy 240 can perform other functions.

Turning to FIG. 10, with further reference to FIGS. 1-6, a process for responding to paging requests received from a femtocell using Bluetooth technology includes the stages shown. Process 1000 can be performed by, e.g., any one of the ATs 115 of FIG. 6. The process 1000 is an example only and not limiting. Many variations to the process 1000 are possible without departing from the scope of the disclosure or the claims. For example, the process 1000 can be altered, e.g., by having stages added, removed, rearranged, combined, and/or performed concurrently.

The process 1000 begins at stage 1002 by scanning for directed paging messages over a Bluetooth communications channel. For example, the AT 115 can periodically enter a page scan state. While in the scan state, the AT 115 monitors for or listens to paging messages over a particular Bluetooth hop channel. The hop channel can be selected from 32 hop channels designated for paging.

In some implementations, the AT 115 is configured to scan for paging messages that include either its unique device access code or a group device access code (GDAC). In doing so, the AT 115 can be responsive to multicast paging messages used in the proximity detection techniques described herein while also maintaining compatibility with conventional Bluetooth devices.

In some implementations, the GDAC can be based on a group Bluetooth device address associated with the AT 115. In some implementations, the AT 115 can initially receive the group Bluetooth device address from, for example, the FAP 230 via an in-band link. Thereafter, the AT 115 can scan for paging messages including the GDAC based on the received group Bluetooth device address.

At stage 1004, the AT 115 determines whether a paging message is received over the Bluetooth communications channel (e.g., Bluetooth hop channel) that the AT 115 is currently scanning In some embodiments, a paging message can only be received by AT 115 if the DAC included in the message is the unique DAC or GDAC associated with the AT 115.

In some embodiments, if a paging message is received, the AT 115 determines whether the DAC included in the paging message is a GDAC at stage 1006. If the DAC included in the paging message is the AT's 115 unique DAC, the AT 115 can proceed with responding to the paging message according to conventional Bluetooth connection procedures at stage 1008.

If the DAC included in the paging message is the GDAC associated with AT 115, the AT 115 can generate and transmit a page response message over a Bluetooth communications channel to the OOB proxy 240 at stage 1010. In some embodiments, the page response message can include the unique DAC associated with the AT 115. In some implementations, the AT 115 transmits the page response message within a predefined timeout period. For example, the AT 115 can be configured to transmit page response messages within a timeout period of 5 seconds. In some implementations, the timeout period can be based on certain device characteristics of the AT 115, such as its processor speed, operating system, components used, etc.

After transmitting the page response message, the AT 115 receives a frequency hopping synchronization (FHS) message from the OOB proxy 240 over a Bluetooth communications channel at stage 1012. The FHS message can include any necessary information for establishing a connection with the responding AT 115. For example, the FHS message can include real-time clock information, the Bluetooth device address of the OOB proxy 240, etc.

At stage 1014, the AT 115 generates and transmits an FHS response message to the OOB proxy 240 over a Bluetooth communications channel. In some implementations, the FHS response message can include the AT's 115 unique Bluetooth device address (e.g., BD_ADDR). Based on the FHS response message, the FAP 230 can determine the identity of the AT 115. In particular, the FAP 230 can use a look-up table or other suitable data structure to identify the AT 115 based on the received unique Bluetooth device address. As a result, the AT 115 can be determined to be in proximity of the FAP 230.

Figure 11:
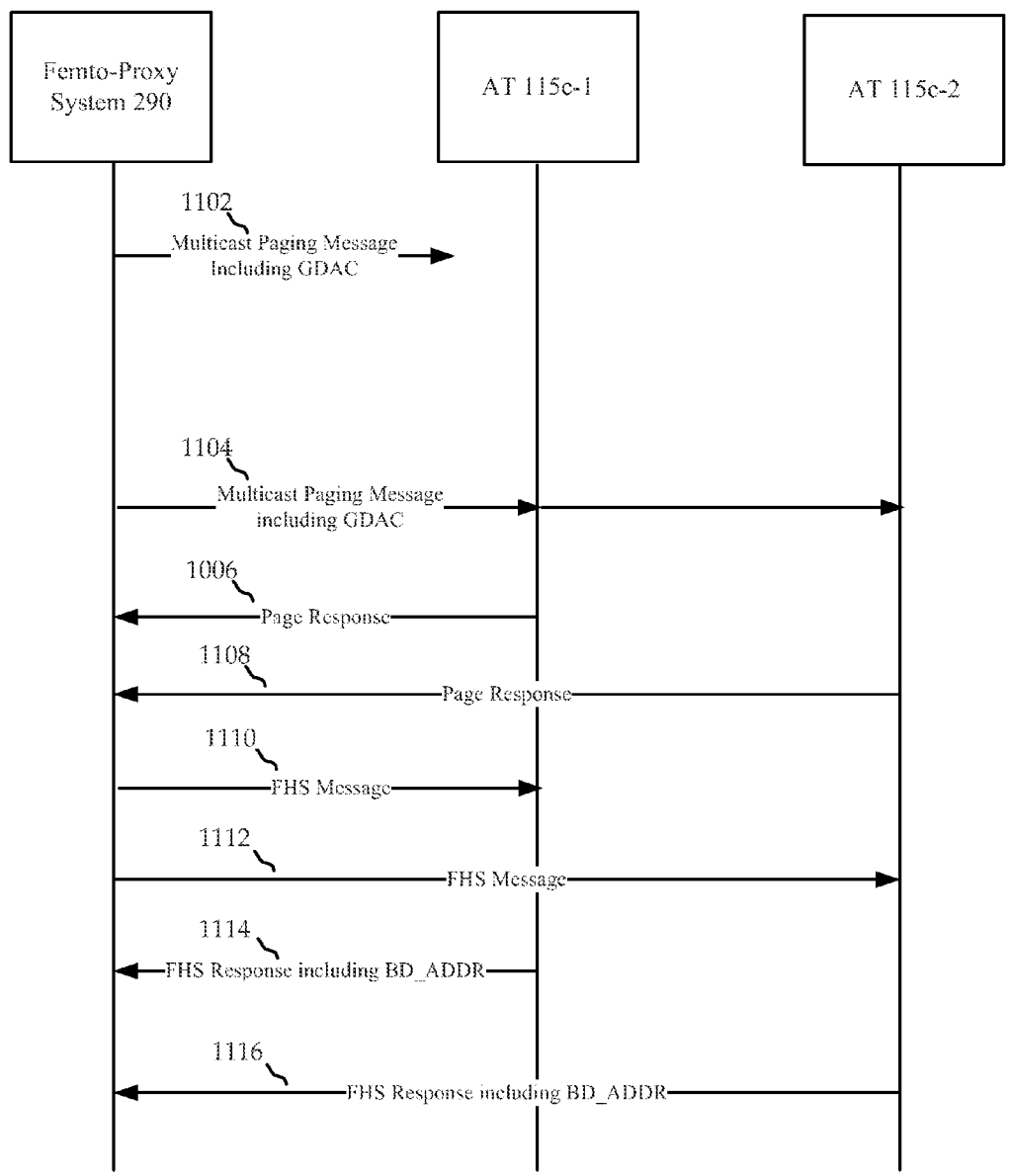
FIG. 11 is a ladder diagram illustrating an example sequence of communications carried out between a femto-proxy system and two access terminals using Bluetooth.

By way of further illustrating the communications between a femto-proxy system and access terminals, FIG. 11 illustrates an example sequence of communications carried out between the femto-proxy system 290 and two associated access terminals: AT 115*c*-1 and AT 115*c*-2. The two access terminals can be similar to the ATs 115 shown in, for example, FIG. 6. It will be appreciated that while the following example is described primarily in terms of devices communicating based on the Bluetooth technology, this context is merely illustrative, and implementations can be broadly applied to other technologies.

At communication 1102, the OOB proxy 240 of the femto-proxy system 290 initiates a paging procedure by multicasting a paging message based on a predefined paging interval. The multicasted paging message can include, for example, a GDAC derived from a group Bluetooth device address. The group Bluetooth device address can be used in place of the unique Bluetooth device addresses for each access terminal in the transmitted paging message. As shown in FIG. 11, the paging message is not received by the AT 115*c*-1 or the AT 115*c*-2. This may occur because, for instance, neither access terminal is currently in range of the femto-proxy system 290.

After a predefined page timeout period, the OOB proxy 240 ceases the current paging procedure (e.g., stops transmitting paging messages and monitoring for page response messages). Because no response messages are received, the femto-proxy system 290 determines that neither access terminal is in proximity. At communication 1104, the OOB proxy 240 initiates a subsequent paging procedure by multicasting a paging message during a following paging interval. The paging message, in this instance, is received by the AT 115*c*-1 and AT 115*c*-2 because the terminals are now in range of the femto-proxy system 290.

Upon receiving the paging message, the AT 115*c*-1 and AT 115*c*-2 determines whether the paging message includes each terminal's unique DAC or a GDAC. Because the paging message includes the GDAC, the AT 115*c*-1 and AT 115*c*-2 generate page response messages. At communication 1106, the AT 115*c*-1 transmits the page response message to the femto-proxy system 290. At communication 1108, the AT 115*c*-2, likewise, responds by transmitting the page response message to the femto-proxy system 290. Both response messages can be received by the femto-proxy system 290 prior to the expiration of the page timeout period. As a result, femto-proxy system 290 processes the responses.

At communication 1110, the femto-proxy system 290 transmits an FHS message to the AT 115c-1. Likewise, at communication 1112, the femto-proxy system 290 transmits an FHS message to the AT 115c-2. At communication 1114, the AT 115c-1 responds with an FHS response message. The response can include the AT's 115c-1 unique Bluetooth device address. As such, the femto-proxy system 290 can determine the identity of the AT 115c-1, and that the terminal is currently in proximity. At communication 1116, the AT 115c-2 responds with an FHS response message, which includes AT's 115c-2 unique Bluetooth device address. As with the AT 115c-1, the femto-proxy system 290 can determine the identity of the AT 115c-2, and that the terminal is currently in proximity.

The various operations of methods described above can be performed by any suitable means capable of performing the corresponding functions. The means can include various hardware and/or software component(s) and/or module(s), including, but not limited to a circuit, an application specific integrate circuit (ASIC), or processor.

The various illustrative logical blocks, modules, and circuits described can be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor can be a microprocessor, but in the alternative, the processor can be any commercially available processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the present disclosure can be embodied directly in hardware, in a software module executed by a processor, or in a combination of the two. A software module can reside in any form of tangible storage medium. Some examples of storage media that can be used include random access memory (RAM), read only memory (ROM), flash memory, EPROM memory, EEPROM memory, registers, a hard disk, a removable disk, a CD-ROM, and so forth. A storage medium can be coupled to a processor such that the processor can read information from, and write information to, the storage medium. In the alternative, the storage medium can be integral to the processor. A software module can be a single instruction, or many instructions, and can be distributed over several different code segments, among different programs, and across multiple storage media.

The methods disclosed herein comprise one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product can perform operations presented herein. For example, such a computer program product can be a computer readable tangible medium having instructions tangibly stored (and/or encoded) thereon, the instructions being executable by one or more processors to perform the operations described herein. The computer program product can include packaging material.

Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method for out-of-band paging in a femto deployment, the method comprising:
    communicating, according to a multicasting scheme, a directed proximity request message over an out-of-band (OOB) communications channel from a femtocell to a plurality of access terminals included in an access control list associated with the femtocell, wherein the multicasting scheme comprises directly addressing each of the plurality of access terminals using a group identifier derived from a group device address associated with the plurality of access terminals, the directed proximity request message requesting an indication that one or more access terminals of the plurality of access terminals are in proximity; and
    receiving a response message from the one or more access terminals over the communications channel, the response message indicating that the one or more access terminals are in proximity to the femtocell and including a device address uniquely associated with a particular access terminal of the one or more access terminals.

2. The method of claim 1, wherein the OOB communications channel used is a short-range-wireless protocol channel.

3. The method of claim 1, wherein the proximity request message is a short-range-wireless protocol paging message.

4. The method of claim 1, wherein the group identifier is a group short-range-wireless protocol device access code associated with the plurality of access terminals.

5. The method of claim 1, wherein the response message is a short-range-wireless protocol page response message.

6. The method of claim 1, wherein the device address uniquely associated with the particular access terminal of the one or more access terminals is a short-range-wireless protocol device access code.

7. The method of claim 1, further comprising receiving a frequency hopping synchronization (FHS) response message.

8. The method of claim 7, wherein the FHS response message includes a short-range-wireless protocol device address uniquely associated with the particular access terminal of the one or more access terminals.

9. A method performed by an access terminal in a femto deployment, the method comprising:
    listening for a directly addressed proximity request message over an out-of-band (OOB) communications channel;
    receiving the directly addressed proximity request message over the OOB communications channel from a femtocell, wherein the directly addressed proximity request message includes either a group identifier derived from a group device address associated with a plurality of access terminals or a unique identifier associated with the access terminal;
    when the proximity request message includes the group identifier, transmitting a first response message including a unique device access code derived from a device address of the access terminal and indicating that the access terminal is in proximity to the femtocell; and
    when the proximity request message includes the unique identifier, transmitting a second response message including the device address of the access terminal and indicating that the access terminal is in proximity to the femtocell.

10. The method of claim 9, wherein the OOB communications channel is a short-range-wireless protocol channel, and the proximity request message is a short-range-wireless protocol paging message.

11. The method of claim 9, wherein the group identifier is a group short-range-wireless protocol device access code derived from a group short-range-wireless protocol device address, wherein the group short-range-wireless protocol device address is associated with the plurality of access terminals.

12. The method of claim 9, wherein the first response message includes a short-range-wireless protocol device access code uniquely associated with the access terminal.

13. The method of claim 9, further comprising transmitting an FHS response message wherein the FHS response message includes a short-range-wireless protocol device address uniquely associated with the access terminal.

14. A femto-proxy system comprising:
    a femtocell, configured to provide macro network access to a plurality of access terminals wherein the plurality of access terminals is included in an access control list associated with the femtocell and authorized to attach to the femtocell according to the access control list; and
    an out-of-band (OOB) radio, integrated with the femtocell and configured to:
    communicate, according to a multicasting scheme, a directed proximity request message over an out-of-band (OOB) communications channel to the plurality of access terminals included in the access control list associated with the femtocell, wherein the multicasting scheme comprises directly addressing each of the plurality of access terminals using a group identifier derived from a group device address associated with the plurality of access terminals, the directed proximity request message requesting an indication that one or more access terminals of the plurality of access terminals are in proximity; and
        receive a response message from the one or more access terminals over the communications channel, the response message indicating that the one or more access terminals are in proximity to the femtocell and including a device address uniquely associated with a particular access terminal of the one or more access terminals.

15. The femto-proxy system of claim 14, wherein the OOB communications channel used is a short-range-wireless protocol channel.

16. The femto-proxy system of claim 14, wherein the proximity request message is a short-range-wireless protocol paging message.

17. The femto-proxy system of claim 14, wherein the group identifier is a group short-range-wireless protocol device access code associated with the plurality of access terminals.

18. The femto-proxy system of claim 14, wherein the response message is a short-range-wireless protocol page response message.

19. The femto-proxy system of claim 14, wherein the device address uniquely associated with the particular access terminal of the one or more access terminals is a short-range-wireless protocol device access code.

20. The femto-proxy system of claim 14, wherein the OOB radio is further configured to receive a frequency hopping synchronization (FHS) response message.

21. The femto-proxy system of claim 20, wherein the FHS response message includes a short-range-wireless protocol device address uniquely associated with the particular access terminal of the one or more access terminals.

22. An access terminal comprising:
    an in-band communications subsystem configured to communicatively couple with a femtocell over a wireless wide area network (WWAN) link on a first WWAN channel and to communicate with at least one macrocell over the WWAN link on a second WWAN channel;

an out-of-band (OOB) communications subsystem configured to communicatively couple with an OOB femto-proxy over an OOB link; and a communications management subsystem, communicatively coupled with the in-band communications subsystem and the OOB communications subsystem, and configured to:

listen for a directly addressed proximity request message over an out-of-band (OOB) communications channel;

receive the directly addressed proximity request message over the OOB communications channel from the femtocell, wherein the directly addressed proximity request message includes either a group identifier derived from a group device address associated with a plurality of access terminals or a unique identifier with the access terminal;

when the proximity request message includes the group identifier, transmit a first response message including a unique device access code derived from a device address of the access terminal and indicating that the access terminal is in proximity to the femtocell; and when the proximity request message includes the unique identifier, transmitting a second response message including the device address of the access terminal and indicating that the access terminal is in proximity to the femtocell.

23. The access terminal of claim 22, wherein the OOB communications channel is a short-range-wireless protocol channel; and the proximity request message is a short-range-wireless protocol paging message.

24. The access terminal of claim 22, wherein the group identifier is a group short-range-wireless protocol device access code derived from a group short-range-wireless protocol device address, wherein the group short-range-wireless protocol device address is associated with the plurality of access terminals.

25. The access terminal of claim 22, wherein the first response message includes a short-range-wireless protocol device access code uniquely associated with the access terminal.

26. The access terminal of claim 22, wherein the communications management subsystem is further configured to transmit an FHS response message wherein the FHS response message includes a short-range-wireless protocol device address uniquely associated with the access terminal.

27. A computer program product residing on a non-transitory, processor-readable medium and comprising processor-readable instructions, which, when executed, cause a processor to:

communicate, according to a multicasting scheme, a directed proximity request message over an out-of-band (OOB) communications channel from a femtocell to a plurality of access terminals included in an access control list associated with the femtocell, wherein the multicasting scheme comprises directly addressing each of the plurality of access terminals using a group identifier derived from a group device address associated with the plurality of access terminals, the directed proximity request message requesting an indication that one or more access terminals of the plurality of access terminals are in proximity; and receive a response message from the one or more access terminals over the communications channel, the response message indicating that the one or more access terminals are in proximity to the femtocell and including a device address uniquely associated with a particular access terminal of the one or more access terminals.

28. The computer program product of claim 27, wherein the OOB communications channel used is a short-range-wireless protocol channel.

29. The computer program product of claim 27, wherein the proximity request message is a short-range-wireless protocol paging message.

30. The computer program product of claim 27, wherein the group identifier is a group short-range-wireless protocol device access code associated with the plurality of access terminals.

31. The computer program product of claim 27, wherein the response message is a short-range-wireless protocol page response message.

32. The computer program product of claim 27, wherein the device address uniquely associated with the particular access terminal of the one or more access terminals is a short-range-wireless protocol device access code.

33. The computer program product of claim 27, wherein the processor-readable instructions further cause the processor to receive a frequency hopping synchronization (FHS) response message.

34. The computer program product of claim 33, wherein the FHS response message includes a short-range-wireless protocol device address uniquely associated with the particular access terminal of the one or more access terminals.

35. A computer program product residing on a non-transitory, processor-readable medium and comprising processor-readable instructions, which, when executed, cause a processor to:

listen for a directly addressed proximity request message over an out-of-band (OOB) communications channel;

receive the directly addressed proximity request message over the OOB communications channel from a femtocell, wherein the directly addressed proximity request message includes either a group identifier derived from a group device address associated with a plurality of access terminals or a unique identifier associated with a particular access terminal of the plurality of access terminals;

when the proximity request message includes the group identifier, transmit a first response message including a unique device access code derived from a device address of the particular access terminal and indicating that the particular access terminal is in proximity to the femtocell; and when the proximity request message includes the unique identifier, transmitting a second response message including the device address of the access terminal and indicating that the particular access terminal is in proximity to the femtocell.

36. The computer program product of claim 35, wherein the OOB communications channel is a short-range-wireless protocol channel; and the proximity request message is a short-range-wireless protocol paging message.

37. The computer program product of claim 35, wherein the group identifier is a group short-range-wireless protocol device access code derived from a group short-range-wireless protocol device address, wherein the group short-range-wireless protocol device address is associated with the plurality of access terminals.

38. The computer program product of claim 35, wherein the first response message includes a short-range-wireless protocol device access code uniquely associated with the particular access terminal.

39. The computer program product of claim 35, wherein the processor-readable instructions further cause the processor to transmit an FHS response message wherein the FHS response message includes a short-range-wireless protocol device address uniquely associated with the particular access terminal.

40. A system comprising:
means for communicating, according to a multicasting scheme, a directed proximity request message over an out-of-band (OOB) communications channel from a femtocell to a plurality of access terminals included in an access control list associated with the femtocell, wherein the multicasting scheme comprises directly addressing each of the plurality of access terminals using a group identifier derived from a group device address associated with the plurality of access terminals and wherein the proximity request message requests an indication that one or more access terminals of the plurality of access terminals are in proximity and wherein the OOB communications channel is a short-range-wireless communications channel; and
means for receiving a response message from the one or more access terminals over the communications channel, the response message indicating that the one or more access terminals are in proximity to the femtocell and including a device address uniquely associated with a particular access terminal of the one or more access terminals.

41. The system of claim 40, wherein the proximity request message is a short-range-wireless protocol paging message.

42. The system of claim 40, wherein the group identifier is a group short-range-wireless protocol device access code associated with the plurality of access terminals.

43. The system of claim 40, wherein the response message is a short-range-wireless protocol page response message.

44. The system of claim 40, wherein the device address uniquely associated with the particular access terminal of the one or more access terminals is a short-range-wireless protocol device access code.

45. The system of claim 40, further comprising means for receiving a frequency hopping synchronization (FHS) response message.

46. The system of claim 45, wherein the FHS response message includes a short-range-wireless protocol device address uniquely associated with the particular access terminal of the one or more access terminals.

47. A system comprising:
means for listening for a directly addressed proximity request message over an out-of-band (OOB) communications channel;
means for receiving the directly addressed proximity request message over the OOB communications channel from a femtocell, wherein the directly addressed proximity request message includes either a group identifier derived from a group device address associated with a plurality of access terminals or a unique identifier associated with a particular access terminal of the plurality of access terminals;
means for transmitting a first response message including a unique device access code derived from a device address of the particular access terminal and indicating that the particular access terminal is in proximity to the femtocell wherein the first response message is in response to the directly addressed proximity request message including the group identifier; and
means for transmitting a second response message including the device address of the particular access terminal and indicating that the particular access terminal is in proximity to the femtocell wherein the second response message is in response to the directly addressed proximity request message including the unique identifier.

48. The system of claim 47, wherein the OOB communications channel is a short-range-wireless protocol channel, and the proximity request message is a short-range-wireless protocol paging message.

49. The system of claim 47, wherein the group identifier is a group short-range-wireless protocol device access code derived from a group short-range-wireless protocol device address, wherein the group short-range-wireless protocol device address is associated with the plurality of access terminals.

50. The system of claim 47, wherein the response message includes a short-range-wireless protocol device access code uniquely associated with the particular access terminal.

51. The system of claim 47, further comprising means for transmitting an FHS response message wherein the FHS response message includes a short-range-wireless protocol device address uniquely associated with the particular access terminal.

* * * * *